(12) United States Patent
Takimoto et al.

(10) Patent No.: US 11,414,150 B2
(45) Date of Patent: Aug. 16, 2022

(54) OPERATING DEVICE FOR HUMAN-POWERED VEHICLE

(71) Applicant: SHIMANO INC., Sakai (JP)

(72) Inventors: Tomohiro Takimoto, Sakai (JP); Hirofumi Fukui, Sakai (JP); Takaya Masuda, Sakai (JP)

(73) Assignee: Shimano Inc., Sakai (JP)

( * ) Notice: Subject to any disclaimer, the term of this patent is extended or adjusted under 35 U.S.C. 154(b) by 229 days.

(21) Appl. No.: 16/864,164

(22) Filed: May 1, 2020

(65) Prior Publication Data
US 2021/0339814 A1 Nov. 4, 2021

(51) Int. Cl.
*B62J 43/30* (2020.01)
*B62K 23/02* (2006.01)
*B62M 25/08* (2006.01)

(52) U.S. Cl.
CPC .............. *B62J 43/30* (2020.02); *B62K 23/02* (2013.01); *B62M 25/08* (2013.01)

(58) Field of Classification Search
CPC .......... B62J 43/30; B62K 23/02; B62M 25/08

USPC .......................................................... 307/9.1
See application file for complete search history.

(56) References Cited

U.S. PATENT DOCUMENTS

2016/0311491 A1   10/2016   Watarai
2019/0031283 A1*  1/2019   Suzuki ................... B62M 6/55

FOREIGN PATENT DOCUMENTS

CN   106064663   11/2016
CN   109808825   5/2019

* cited by examiner

*Primary Examiner* — Hal Kaplan
(74) *Attorney, Agent, or Firm* — Mori & Ward, LLP

(57) ABSTRACT

An operating device for a human-powered vehicle comprises a base member, an operating member, an electric switch, and a controller. The operating member is movably coupled to the base member. The electric switch is configured to receive a user input in response to a movement of the operating member to operate an additional device. The controller is configured to change a mode of the controller at least between a first mode in which the controller is configured to be under first power consumption and a second mode in which the controller is configured to be under second power consumption different from the first power consumption.

19 Claims, 17 Drawing Sheets

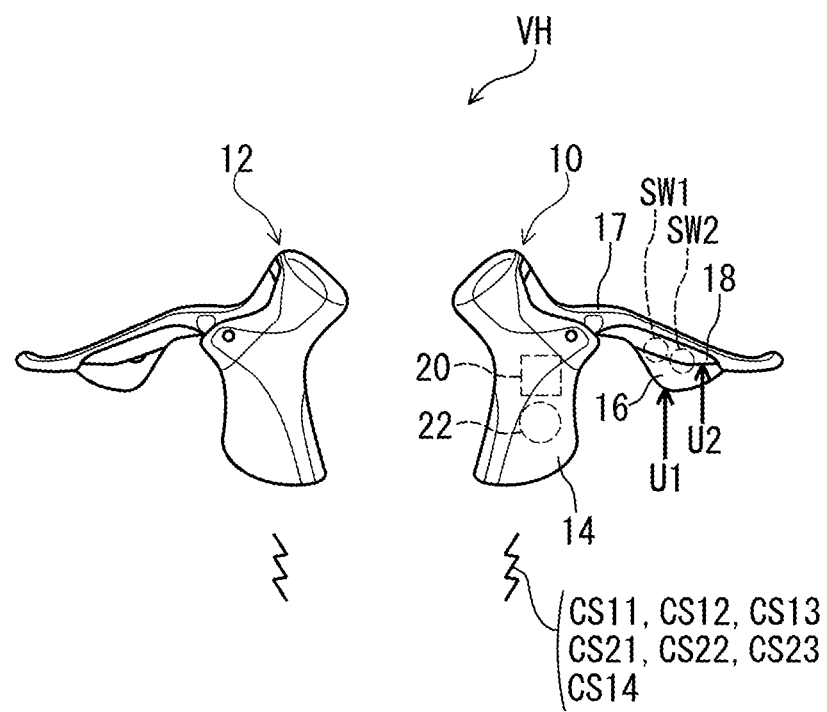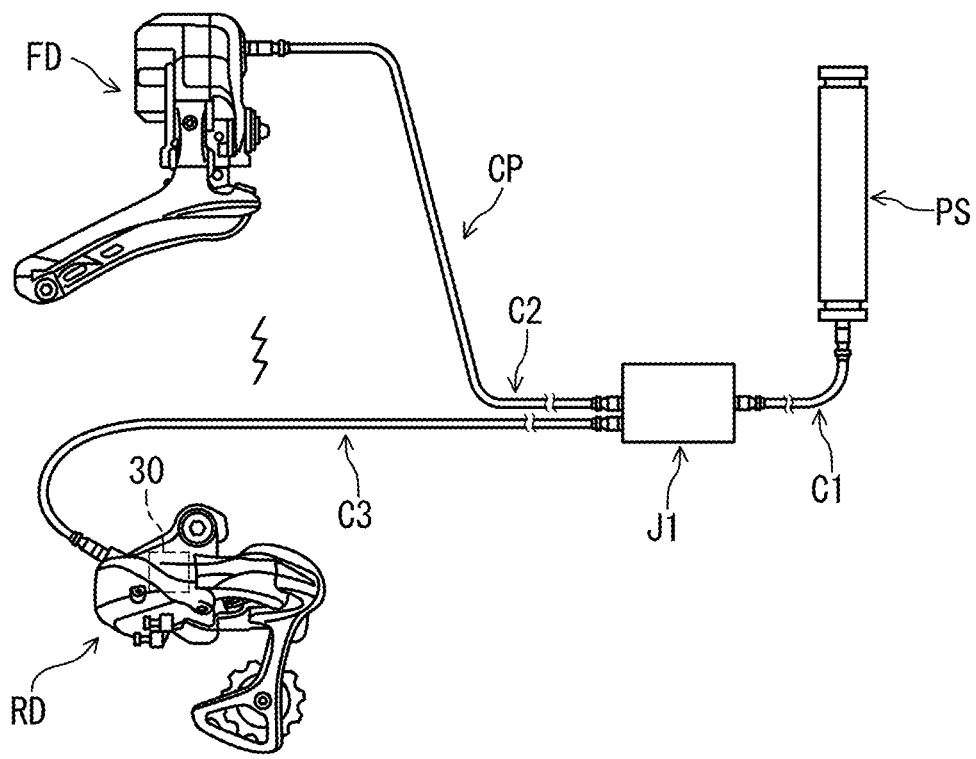
FIG. 2

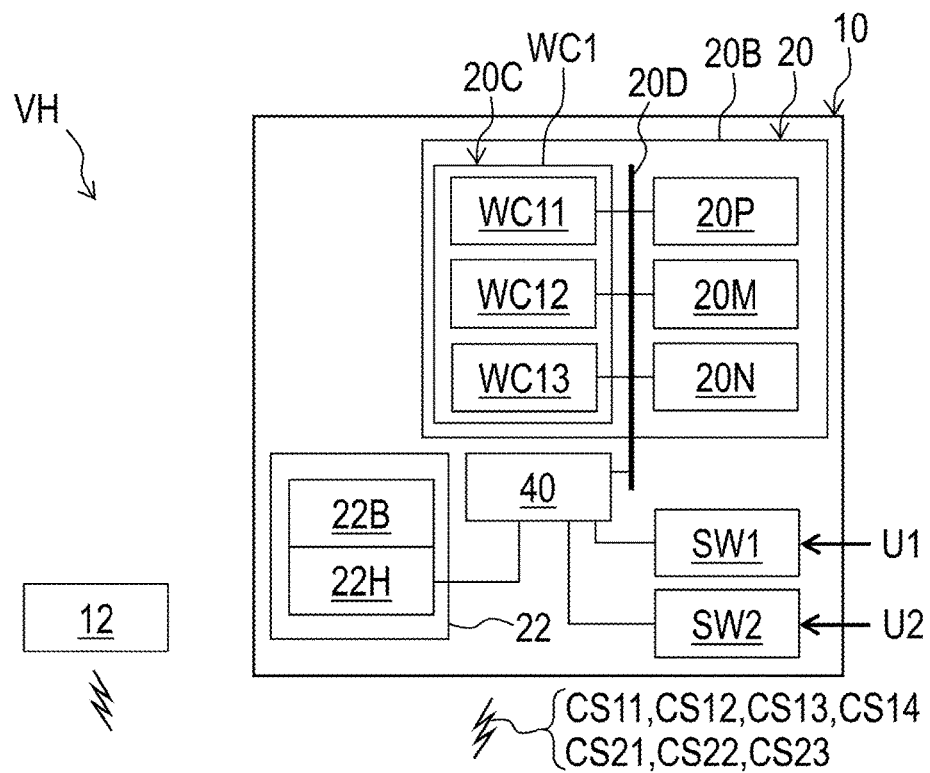
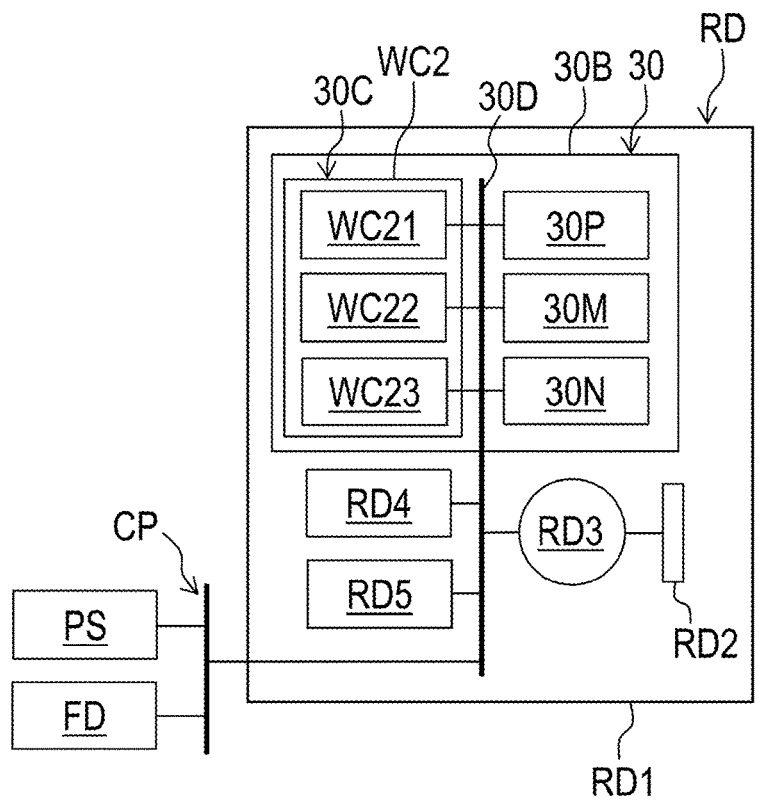
FIG. 3

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit.

SUMMARY OF THE INVENTION

In accordance with a first aspect of the present invention, an operating device for a human-powered vehicle comprises a base member, an operating member, an electric switch, and a controller. The operating member is movably coupled to the base member. The electric switch is configured to receive a user input in response to a movement of the operating member to operate an additional device. The controller is configured to change a mode of the controller at least between a first mode in which the controller is configured to be under first power consumption and a second mode in which the controller is configured to be under second power consumption different from the first power consumption.

With the operating device according to the first aspect, it is possible to reduce power consumption of the operating device by changing the mode of the operating device between the first mode and the second mode.

In accordance with a second aspect of the present invention, the operating device according to the first aspect is configured so that the controller is configured to change the mode between the first mode and the second mode in response to input information.

With the operating device according to the second aspect, it is possible to change the mode between the first mode and the second mode using the input information.

In accordance with a third aspect of the present invention, the operating device according to the second aspect is configured so that the first power consumption is lower than the second power consumption. The controller is configured to change the mode from the first mode to the second mode in response to the input information.

With the operating device according to the third aspect, it is possible to change the mode from the first mode having lower power consumption to the second mode having higher power consumption using the input information.

In accordance with a fourth aspect of the present invention, the operating device according to any one of the first to third aspects is configured so that the controller is configured to change the mode from the second mode to the first mode if the controller does not detect input information for a determination time in the second mode.

With the operating device according to the fourth aspect, it is possible to change the mode from the second mode to the first mode using the input information.

In accordance with a fifth aspect of the present invention, the operating device according to the second or third aspect is configured so that the input information includes the user input received by the electric switch. The controller is configured to change the mode from the first mode to the second mode in response to the user input received by the electric switch.

With the operating device according to the fifth aspect, it is possible to change the mode from the first mode to the second mode using the electric switch.

In accordance with a sixth aspect of the present invention, the operating device according to the fifth aspect is configured so that the controller is configured to change the mode from the second mode to the first mode if the controller does not detect the user input for a determination time in the second mode.

With the operating device according to the sixth aspect, it is possible to change the mode from the first mode to the second mode using the electric switch.

In accordance with a seventh aspect of the present invention, the operating device according to any one of the third to sixth aspects is configured so that the second power consumption includes waiting power consumption and activating power consumption higher than the waiting power consumption. The first power consumption is lower than the waiting power consumption and the activating power consumption. The second mode includes a waiting mode in which the operating device is under the waiting power consumption and an activating mode in which the operating device is under the activating power consumption.

With the operating device according to the seventh aspect, it is possible to reduce power consumption of the operating device using the first mode, the waiting mode, and the activating mode.

In accordance with an eighth aspect of the present invention, the operating device according to the seventh aspect is configured so that the controller is configured to change the mode from the first mode to the activating mode in response to the input information.

With the operating device according to the eighth aspect, it is possible to change the mode from the first mode having lower power consumption to the activating mode having higher power consumption.

In accordance with a ninth aspect of the present invention, the operating device according to the eighth aspect is configured so that the controller is configured to generate a control signal in the activating mode.

With the operating device according to the ninth aspect, it is possible to control the additional or another device using the control signal in the activating mode.

In accordance with a tenth aspect of the present invention, the operating device according to the ninth aspect is configured so that the controller is configured to generate the control signal in response to changing the mode to the activating mode.

With the operating device according to the tenth aspect, it is possible to shorten a time lag between the changing of the mode to the activating mode and the generating of the control signal, reducing power consumption of the operating device.

In accordance with an eleventh aspect of the present invention, the operating device according to the ninth or tenth aspect is configured so that the controller is configured to change the mode from the activating mode to the waiting mode in response to completion of generating the control signal.

With the operating device according to the eleventh aspect, it is possible to reduce power consumption of the operating device using the waiting mode.

In accordance with a twelfth aspect of the present invention, the operating device according to any one of the seventh to eleventh aspects is configured so that the controller is configured to change the mode between the activating mode and the waiting mode at a constant interval while the controller continuously detects the input information in the second mode.

With the operating device according to the twelfth aspect, it is possible to execute multiple changes between the activating mode and the waiting mode based on a single continuous input.

In accordance with a thirteenth aspect of the present invention, the operating device according to any one of the seventh to twelfth aspects is configured so that the controller is configured to change the mode from the waiting mode to the activating mode if the controller detects interruption of the input information in the second mode.

With the operating device according to the thirteenth aspect, it is possible to change the mode from the waiting mode to the activating mode to generate a signal using the interruption of the input information.

In accordance with a fourteenth aspect of the present invention, the operating device according to the thirteenth aspect is configured so that the second power consumption includes sleep power consumption higher than the first power consumption, the sleep power consumption being lower than the activating power consumption and the waiting power consumption. The second mode includes a sleep mode in which the operating device is configured to be under the sleep power consumption. The controller is configured to change the mode from the activating mode to the sleep mode if the controller generates the control signal after the controller detects the interruption of the input information in the second mode.

With the operating device according to the fourteenth aspect, it is possible to change the mode from the waiting mod to the sleep mode through the activating mode to generate the control signal using the interruption of the input information.

In accordance with a fifteenth aspect of the present invention, the operating device according to the fourteenth aspect is configured so that the controller is configured to change the mode of the controller from the sleep mode to the activating mode in response to the input information.

With the operating device according to the fifteenth aspect, it is possible to change the mode from the sleep mode to the activating mode using the input information.

In accordance with a sixteenth aspect of the present invention, the operating device according to the fourteenth aspect is configured so that the controller is configured to change the mode from the sleep mode to the first mode if the controller does not detect the input information for a determination time in the sleep mode.

With the operating device according to the sixteenth aspect, it is possible to reduce power consumption of the operating device when the controller does not detect the input information.

In accordance with a seventeenth aspect of the present invention, the operating device according to any one of the first to sixteenth aspects is configured so that the controller is configured to be stopped from consuming electricity in the first mode.

With the operating device according to the seventeenth aspect, it is possible to effectively reduce power consumption of the operating device.

In accordance with an eighteenth aspect of the present invention, the operating device according to any one of the first to seventeenth aspects is configured so that the controller is configured to determine whether the additional device is in a predetermined mode based on the input information. The controller is configured to change the mode from the second mode to the first mode if the controller concludes that the additional device is in the predetermined mode.

With the operating device according to the eighteenth aspect, it is possible to change the mode from the second mode to the first mode having in accordance with a state of the additional device, reducing power consumption of the operating device.

In accordance with a nineteenth aspect of the present invention, the operating device according to the eighteenth aspect is configured so that the controller is configured to generate a check signal in the second mode so as to determine whether the additional device is in the predetermined mode. The controller is configured to change the mode from the second mode to the first mode if the controller concludes that the additional device is in the predetermined mode.

With the operating device according to the nineteenth aspect, it is possible to reliably determine whether the additional device is in the predetermined mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a schematic diagram of the human-powered vehicle illustrated in FIG. 1.

FIG. 3 is a schematic block diagram of the human-powered vehicle illustrated in FIG. 1.

DESCRIPTION OF THE EMBODIMENTS

Figure 1:
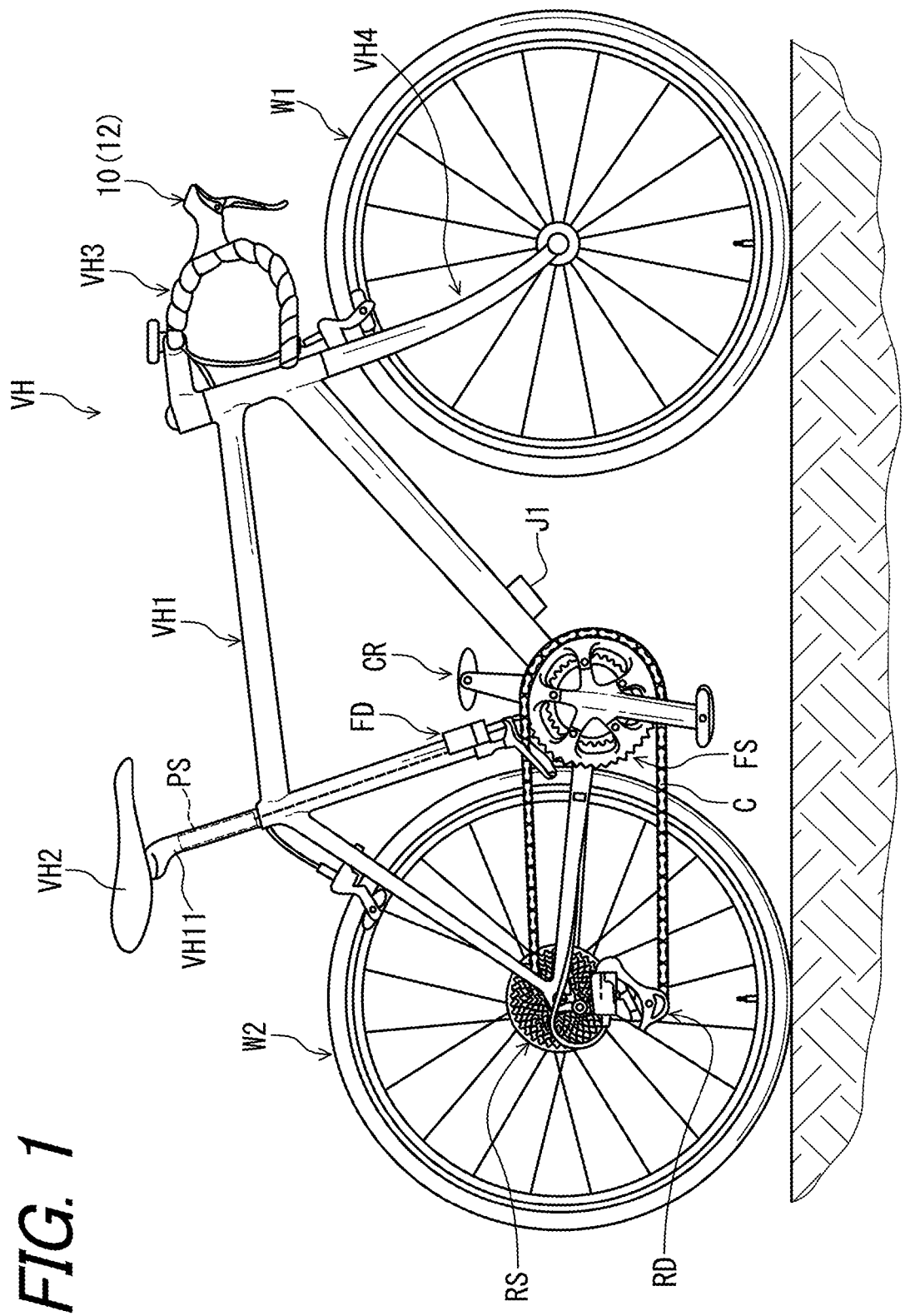
FIG. 1 is a side elevational view of a human-powered vehicle including an operating device in accordance with an embodiment.

The embodiment(s) will now be described with reference to the accompanying drawings, wherein like reference numerals designate corresponding or identical elements throughout the various drawings.

As seen in FIG. 1, a human-powered vehicle VH includes operating devices 10 and 12 in accordance with an embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In the present disclosure, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In the present disclosure, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating devices 10 and 12 can be applied to mountain bikes or any type of human-powered vehicles.

The human-powered vehicle VH further includes a frame VH1, a saddle VH2, a handlebar VH3, a front fork VH4, a front wheel W1, and a rear wheel W2. The front fork VH4 is rotatably mounted to the frame VH1. The handlebar VH3 is secured to the front fork VH4. The front wheel W1 is rotatably coupled to the front fork VH4. The rear wheel W2 is rotatably coupled to the frame VH1.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the operating device 10 or 12 or other components, should be interpreted relative to the human-powered vehicle VH equipped with the operating device 10 or 12 as used in an upright riding position on a horizontal surface.

The human-powered vehicle VH includes a crank CR, a front sprocket assembly FS, a rear sprocket assembly RS, a chain C, an additional device RD, an additional device FD, and a power supply PS. The front sprocket assembly FS is secured to the crank CR. The rear sprocket assembly RS is provided to the rear wheel W2. The chain C is engaged with the front sprocket assembly FS and the rear sprocket assembly RS. Each of the additional devices RD and FD includes a gear changing device such as a derailleur. The additional device RD is mounted to the frame VH1 and is configured to shift the chain C relative to the rear sprocket assembly RS to change a gear position. The additional device FD is mounted to the frame VH1 and is configured to shift the chain C relative to the front sprocket assembly FS to change a gear position. In the present disclosure, the power supply PS is provided in a seatpost VH11 provided to the frame VH1. However, the location of the power supply PS is not limited to this embodiment.

As seen in FIG. 2, the human-powered vehicle VH includes an electric communication path CP. The power supply PS is electrically connected to the additional device RD and the additional device FD with the electric communication path CP to supply electricity to the additional device RD and the additional device FD.

The electric communication path CP includes a junction J1 and electric cables C1 to C3. Each of the electric cables C1 to C3 includes electric connectors at both ends thereof. The junction J1 is electrically connected to the power supply PS with the electric cable C1. The junction J1 is electrically connected to the additional device FD with the electric cable C2. The junction J1 is electrically connected to the additional device RD with the electric cable C3.

As seen in FIG. 2, the operating device 10 for the human-powered vehicle VH comprises a base member 14. The base member 14 is configured to be mounted to the handlebar VH3 (see e.g., FIG. 1).

The operating device 10 for the human-powered vehicle VH comprises an operating member 16. The operating member 16 is movably coupled to the base member 14. In the present disclosure, the operating device 10 comprises an additional operating member 17. The additional operating member 17 is movably coupled to the base member 14 to operate another device such as a brake device. The additional operating member 17 is pivotally coupled to the base member 14. However, the additional operating member 17 can be omitted from the operating device 10.

The operating device 10 for the human-powered vehicle VH comprises an electric switch SW1. The electric switch SW1 is configured to receive a user input U1 in response to a movement of the operating member 16 to operate the additional device RD. In the present disclosure, the electric switch SW1 includes a normally open switch. Examples of the electric switch SW1 includes a push-button switch and a lever switch. The electric switch SW1 is coupled to one of the operating member 16 and the additional operating member 17. The electric switch SW1 is configured to be turned on in response to the movement of the operating member 16. The receipt of the user input U1 includes turning on the electric switch SW1.

The electric switch SW1 and the operating member 16 are configured to be attached to the additional operating member 17 to be movable relative to the base member 14 along with the additional operating member 17. The operating member 16 is movably mounted to the additional operating member 17. However, the electric switch SW1 and the operating member 16 can be directly attached to the base member 14.

The operating device 10 for the human-powered vehicle VH comprises an operating member 18. The operating member 18 is movably coupled to the base member 14. The operating device 10 for the human-powered vehicle VH comprises an electric switch SW2. The electric switch SW2 is configured to receive a user input U2 in response to a movement of the operating member 18 to operate the additional device RD. The operating member 18 and the electric switch SW2 are configured to be attached to the additional operating member 17. The operating member 18 has substantially the same structure as the structure of the operating member 16. The electric switch SW2 has substantially the same structure as the structure of the electric switch SW1. Thus, they will not be described in detail here for the sake of brevity.

As seen in FIG. 3, the operating device 10 for the human-powered vehicle VH comprises a controller 20. The controller 20 includes a processor 20P, a memory 20M, a circuit board 20B, and a system bus 20D. The processor 20P and the memory 20M are electrically mounted on the circuit board 20B. The processor 20P includes a central processing unit (CPU) and a memory controller. The memory 20M is electrically connected to the processor 20P. The memory 20M includes a read only memory (ROM) and a random-access memory (RAM). The memory 20M includes storage areas each having an address in the ROM and the RAM. The processor 20P is configured to control the memory 20M to store data in the storage areas of the memory 20M and reads data from the storage areas of the memory 20M. The circuit board 20B, the electric switch SW1, and the electric switch SW2 are electrically connected to the system bus 20D. The electric switch SW1 and the electric switch SW2 are electrically connected to the processor 20P and the memory 20M with the circuit board 20B and the system bus 20D. The memory 20M (e.g., the ROM) stores a program. The program is read into the processor 20P, and thereby the configuration and/or algorithm of the controller 20 is performed.

The controller 20 includes a communicator 20C configured to communicate with another device, e.g., the additional device RD and the additional device FD. The communicator 20C is configured to transmit signals to another device. The communicator 20C is configured to transmit a control signal CS11, CS12, and/or CS13 in response to the user input U1 received by the electric switch SW1. The communicator 20C is configured to transmit a control signal CS21, CS22, and/or CS23 in response to the user input U2 received by the electric switch SW2. The communicator 20C is configured to receive information from another device. The communicator 20C includes a wireless communicator WC1 configured to wirelessly communicate with another device. The wireless communicator WC1 is configured to transmit the control signal CS11, CS12, and/or CS13 in response to the user input U1. The wireless communicator WC1 is configured to transmit the control signal CS21, CS22, and/or CS23 in response to the user input U2. The wireless communicator WC1 is configured to wirelessly receive information from another device. The wireless communicator WC1 is configured to be electrically connected to the controller 20. The operating device 10 can also be referred to as a wireless operating device 10.

The wireless communicator WC1 is electrically mounted on the circuit board 20B. The wireless communicator WC1 is electrically connected to the processor 20P and the memory 20M with the circuit board 20B and the system bus 20D. The wireless communicator WC1 includes a signal transmitting circuit WC11, a signal receiving circuit WC12, and an antenna WC13 electrically connected to the signal transmitting circuit WC11 and the signal receiving circuit WC12. The signal transmitting circuit WC11, the signal receiving circuit WC12, and the antenna WC13 are electrically mounted on the circuit board 20B. Thus, the wireless communicator WC1 can also be referred to as a wireless communication circuit or circuitry WC1. The communicator 20C can also be referred to as a communication circuit or circuitry 20C. The controller 20 can also be referred to as a control circuit or circuitry 20.

The signal transmitting circuit WC11 of the wireless communicator WC1 is configured to superimpose digital signals on carrier wave using a predetermined wireless communication protocol to wirelessly transmit signals via the antenna WC13. In the present disclosure, the signal transmitting circuit WC11 is configured to encrypt a signal using a cryptographic key to generate encrypted wireless signals.

The signal receiving circuit WC12 of the wireless communicator WC1 is configured to receives a wireless signal via the antenna WC13. In the present disclosure, the signal receiving circuit WC12 is configured to decode the wireless signal to recognize signals and/or information wirelessly transmitted from another wireless communicator. The signal receiving circuit WC12 is configured to decrypt the wireless signal using the cryptographic key.

The operating device 10 includes an electric power source 22. The electric power source 22 is configured to supply electricity to the controller 20 and the communicator 20C. The electric power source 22 is configured to be electrically connected to the controller 20 and the communicator 20C. In the present disclosure, the electric power source 22 includes a battery 22B and a battery holder 22H. The battery 22B includes a replaceable and/or rechargeable battery. The battery holder 22H is configured to be electrically connected to the communicator 20C via the circuit board 20B and the system bus 20D. The battery 22B is configured to be detachably attached to the battery holder 22H. However, the electric power source 22 is not limited to this embodiment. For example, the electric power source 22 can include another component such as a capacitor and an electricity generation element (e.g., a piezoelectric element) instead of or in addition to the battery 22B and the battery holder 22H.

The controller 20 further comprises a notifier 20N. The notifier 20N is configured to notify a user of a status of the operating device 10. In the present disclosure, the notifier 20N is mounted to the circuit board 20B. For example, the notifier 20N includes an indicator such as a light-emitting diode. The notifier 20N is configured to indicate the status of the operating device 10 with light. Examples of the status of the operating device 10 includes a state of communication between the controller 20 and another device, a mode of the controller 20, and a remaining level of the electric power source 22.

The controller 20 is configured to manage the power use of hardware in the operating device 10. The controller 20 is configured to control supply of electricity to each of the processor 20P, the memory 20M, the wireless communicator WC1, the notifier 20N, and other electric components installed in the operating device 10. The controller 20 is configured to separately control supply of electricity to each of the signal transmitting circuit WC11, the signal receiving circuit WC12, the antenna WC13, and the notifier 20N. Thus, the controller 20 has a plurality of modes having different power consumption.

Figure 4:
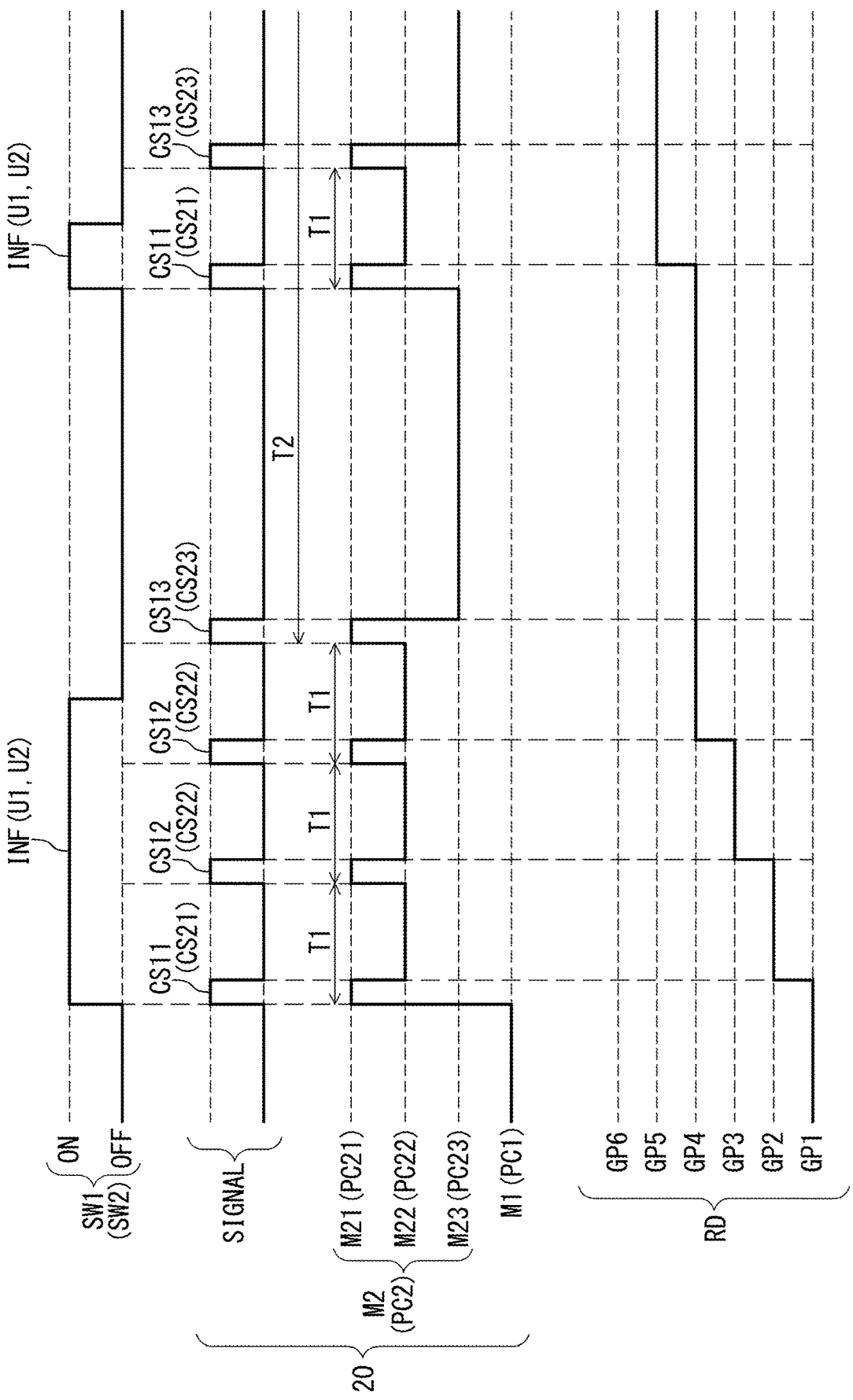
FIG. 4 is a timing chart showing the control of the human-powered vehicle illustrated in FIG. 1.

As seen in FIG. 4, the controller 20 is configured to change a mode of the controller 20 at least between a first mode M1 in which the controller 20 is configured to be under first power consumption PC1 and a second mode M2 in which the controller 20 is configured to be under second power consumption PC2 different from the first power consumption PC1. Power consumption of the operating device 10 is substantially equal to power consumption of the controller 20. Thus, the power consumption of the operating device 10 is proportional to the power consumption of the controller 20.

In the present disclosure, the first power consumption PC1 is lower than the second power consumption PC2. The controller 20 is configured to be stopped from consuming electricity in the first mode M1. Namely, the controller 20 is turned off in the first mode M1. In the second mode M2, electricity is supplied to at least part of the controller 20 from the electric power source 22. However, the first mode M1 can be a mode in which the controller 20 is configured to consume electricity.

The controller 20 is configured to change the mode between the first mode M1 and the second mode M2 in response to input information INF. The controller 20 is configured to change the mode from the first mode M1 to the second mode M2 in response to the input information INF. The input information INF includes the user input U1 received by the electric switch SW1. Namely, the controller 20 is configured to change the mode from the first mode M1 to the second mode M2 in response to the user input U1 received by the electric switch SW1. However, the input information INF can include other information. Examples of the input information INF include the user input U1 received by the electric switch SW1, information transmitted from another device, and physical change in the operating device 10 such as vibration generated in and/or transmitted to the operating device 10.

The second power consumption PC2 includes waiting power consumption PC22 and activating power consumption PC21 higher than the waiting power consumption PC22. The first power consumption PC1 is lower than the waiting power consumption PC22 and the activating power consumption PC21. The second mode M2 includes a waiting mode M22 in which the operating device 10 is under the waiting power consumption PC22 and an activating mode M21 in which the operating device 10 is under the activating power consumption PC21. The controller 20 is configured to change the mode from the first mode M1 to the activating mode M21 in response to the input information INF.

In the activating mode M21, the controller 20 is configured to allow electricity to be supplied to the processor 20P, the memory 20M, the signal transmitting circuit WC11, the signal receiving circuit WC12, and the antenna WC13 from the electric power source 22 (see e.g., FIG. 3). Thus, the controller 20 is configured to generate and transmit signals to another device and to recognize signals transmitted from another device in the activating mode M21. Meanwhile, in the waiting mode M22, the controller 20 is configured to interrupt electricity from the electric power source 22 to the signal transmitting circuit WC11 while the controller 20 is configured to allow electricity to be supplied to the processor 20P, the memory 20M, the signal receiving circuit WC12, and the antenna WC13 from the electric power source 22 (see e.g., FIG. 3). Thus, the controller 20 is configured to recognize signals transmitted from another device but not to generate and transmit signals to another device in the waiting mode M22.

The second power consumption PC2 includes sleep power consumption PC23 higher than the first power consumption PC1. The sleep power consumption PC23 is lower than the activating power consumption PC21 and the waiting power consumption PC22. The second mode M2 includes a sleep mode M23 in which the operating device 10 is configured to be under the sleep power consumption PC23. The controller 20 is configured to allow electricity to be supplied to the processor 20P and the memory 20M from the electric power source 22 in the sleep mode M23. However, the controller 20 is configured to interrupt electricity from the electric power source 22 to the signal transmitting circuit WC11, the signal receiving circuit WC12, and the antenna WC13 in the sleep mode M23. Thus, the controller 20 is configured not to generate and transmit signals to another device and not to recognize signals transmitted from another device in the sleep mode M23.

As seen in FIG. 3, the operating device 10 comprises an electric power controller 40. The electric power controller 40 is configured to control electricity supplied from the electric power source 22 to the controller 20. The electric power controller 40 is configured to start to supply electricity to the controller 20 in response to the input information INF (e.g., turning on one of the electric switches SW1 and SW2). The electric power controller 40 is configured to start to supply electricity to the controller 20 in response to the input information INF in the first mode M1. The electric power controller 40 is configured to stop supplying electricity to the controller 20 in response to a control voltage supplied from the controller 20. The electric power controller 40 is electrically connected to the controller 20, the electric power source 22, and the electric switches SW1 and SW2.

Figure 5:
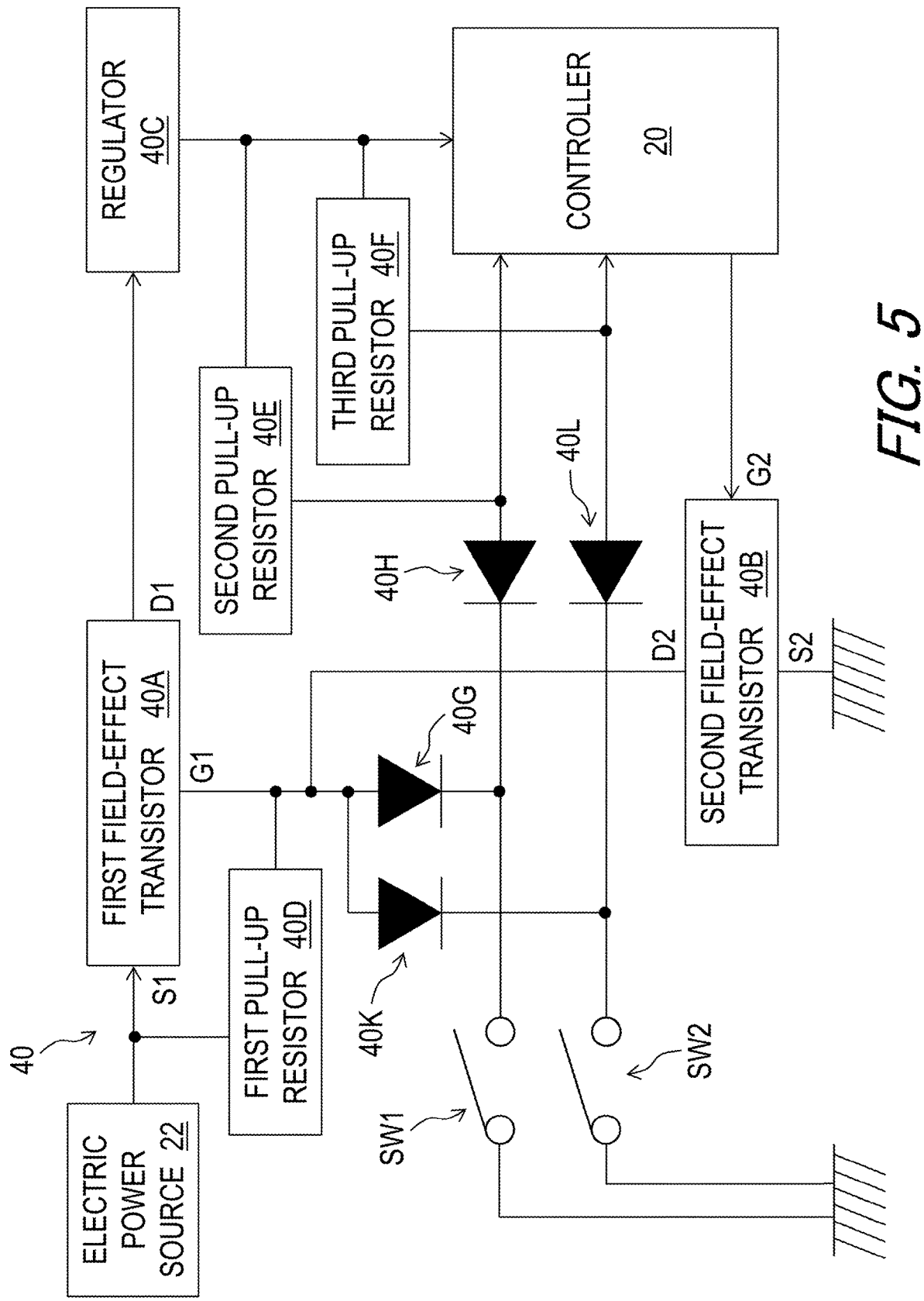
FIG. 5 is a schematic block diagram of an electric power controller of the human-powered vehicle illustrated in FIG. 1.

As seen in FIG. 5, the electric power controller 40 includes a first field-effect transistor (FET) 40A, a second field-effect transistor (FET) 40B, a regulator 40C, a first pull-up resistor 40D, a second pull-up resistor 40E, a third pull-up resistor 40F, a first diode 40G, a second diode 40H, a third diode 40K, and a fourth diode 40L.

The first FET 40A is configured to control the flow of current between a first source terminal S1 and a first drain terminal D1 in response to a first gate voltage applied to a first gate terminal G1. The first FET 40A is configured to allow the current to flow between the first source terminal S1 and the first drain terminal D1 while the first gate voltage higher than a first threshold voltage is applied to the first gate terminal G1. The first FET 40A includes a p-type metal-oxide-semiconductor field-effect transistor (MOSFET). However, the first FET 40A can include other FETs such as a n-type MOSFET.

The second FET 40B is configured to control the flow of current between a second source terminal S2 and a second drain terminal D2 in response to a second gate voltage applied to a second gate terminal G2. The second FET 40B is configured to allow the current to flow between the second source terminal S2 and the second drain terminal D2 while the second gate voltage higher than a second threshold voltage is applied to the second gate terminal G2. The second FET 40B includes a n-type MOSFET. However, the second FET 40B can include other FETs such as a p-type MOSFET.

The regulator 40C is configured to control an output voltage based on an input voltage. Examples of the regulator 40C include a DC-to-DC converter and a low-dropout (LDO) regulator. The first pull-up resistor 40D is configured to hold the first gate voltage applied to the first gate terminal G1 of the first FET 40A in response to the activation of one of the electric switches SW1 and SW2. The second pull-up resistor 40E is configured to hold a voltage applied from the regulator 40C to the controller 20 in response to the activation of the electric switch SW1. The third pull-up resistor 40F is configured to hold a voltage applied from the regulator 40C to the controller 20 in response to the activation of the electric switch SW2.

The first diode 40G is configured to allow a current to flow in one direction. The second diode 40H is configured to allow a current to flow in one direction. The third diode 40K is configured to allow a current to flow in one direction. The fourth diode 40L is configured to allow a current to flow in one direction.

When one of the electric switches SW1 and SW2 is turned on, the first gate voltage is applied from the electric power source 22 to the first gate terminal G1 of the first FET 40A by the action of the first pull-up resistor 40D, the first FET 40A controls a current to flow from the first source terminal S1 to the first drain terminal D1 depending on the first gate voltage applied to the first gate terminal G1 of the first FET 40A.

The regulator 40C controls the voltage applied from the first FET 40A to the controller 20 at a predetermined level. The voltage applied from the regulator 40C to the controller 20 is held by the action of the second pull-up resistor 40E if the electric switch SW1 is turned on. The voltage applied from the regulator 40C to the controller 20 is held by the action of the third pull-up resistor 40F if the electric switch SW2 is turned on. Thus, the controller 20 is powered by the electric power source 22 through the electric power controller 40.

The controller 20 detects the operation of the electric switch SW1 or SW2 after the controller 20 is turned on. For example, the controller 20 includes a gate driver configured to supply the second gate voltage to the second FET 40B. The controller 20 applies the second gate voltage to the second gate terminal G2 of the second FET 40B in response to the operation of one of the electric switches SW1 and SW2. The first gate voltage is applied from the second FET 40B to the first gate terminal G1 of the first FET 40A while the controller 20 applied the second gate voltage to the second gate terminal G2 of the second FET 40B. This maintains supply of electricity from the electric power source 22 to the controller 20 after both the electric switches SW1 and SW2 are turned off.

The first gate voltage applied from the second FET 40B to the first gate terminal G1 of the first FET 40A is stopped when the controller 20 stops the supply of the second gate voltage to the second gate terminal G2. Thus, the controller 20 is configured to stop supply of a control current from the electric power source 22 to the controller 20 based on the input information INF. The first FET 40A has a leakage current having a current value lower than a current value of a minimum control current of the controller 20 when the first FET 40A is turned off. Thus, the controller 20 is configured to change the mode from the second mode M2 to the first mode M1 by stopping supply of the second gate voltage. The electric power controller 40 recognizes the first power consumption PC1 depicted in FIG. 4. However, the change of the mode from the second mode M2 to the first mode M1 can be executed by components other than the electric power controller 40 if need and/or desired.

As seen in FIG. 4, the controller 20 is configured to generate the control signal CS11, CS12, or CS13 in the activating mode M21. The controller 20 is configured to generate the control signal CS11, CS12, or CS13 in response to changing the mode to the activating mode M21. The controller 20 is configured to change the mode from the activating mode M21 to the waiting mode M22 in response to completion of generating the control signal CS11, CS12, or CS13. The controller 20 is configured to transmit the control signal CS11, CS12, or CS13 in the activating mode M21 after generating control signal CS11, CS12, or CS13.

In the present disclosure, the control signals CS11, CS12, CS13, CS21, CS22, and CS23 are distinguishable from each other as a signal. The control signals CS11 and CS12 indicate upshifting of the additional device RD. The control signals CS21 and CS22 indicate downshifting of the additional device RD. The control signals CS13 and CS23 indicate that the operating device 10 is in the sleep mode M23. However, at least one control signal of the control signals CS11, CS12, and CS13 can be identical with another control signal of the control signals CS11, CS12, and CS13. At least one control signal of the control signals CS21, CS22, and CS23 can be identical with another control signal of the control signals CS21, CS22, and CS23.

The controller 20 is configured to change the mode from the first mode M1 to the activating mode M21 in response to the input information INF, specifically the user input U1, in the first mode M1. The controller 20 is configured to change the mode from the first mode M1 to the activating mode M21 if the electric switch SW1 is turned on in the first mode M1. The controller 20 is configured to enter the activating mode M21 if the electric switch SW1 is turned on in the first mode M1. The controller 20 is configured to generate the control signal CS11 in response to changing the mode from the first mode M1 to the activating mode M21. The controller 20 is configured to change the mode from the activating mode M21 to the waiting mode M22 in response to completion of generating the control signal CS11.

The controller 20 is configured to change the mode between the activating mode M21 and the waiting mode M22 at a constant interval while the controller 20 continuously detects the input information INF in the second mode M2. In the present disclosure, the controller 20 is configured to change the mode between the activating mode M21 and the waiting mode M22 at the constant interval while the controller 20 continuously detects the user input U1 in the second mode M2. The controller 20 is configured to change the mode from the waiting mode M22 to the activating mode M21 if the controller 20 concludes that the electric switch SW1 continuously receives the user input U1 for a signal determination time T1 after generating the control signal CS11. The controller 20 is configured to generate the control signal CS12 in response to changing the mode from the waiting mode M22 to the activating mode M21. The controller 20 is configured to change the mode from the activating mode M21 to the waiting mode M22 in response to completion of generating the control signal CS12.

The controller 20 is configured to change the mode from the waiting mode M22 to the activating mode M21 if the controller 20 concludes that the electric switch SW1 continuously receives the user input U1 for the signal determination time T1 after generating the previous control signal CS12. The controller 20 is configured to generate the control signal CS12 in response to changing the mode from the waiting mode M22 to the activating mode M21. The controller 20 is configured to change the mode from the activating mode M21 to the waiting mode M22 in response to completion of generating the control signal CS12.

The controller 20 is configured to change the mode from the waiting mode M22 to the activating mode M21 if the controller 20 detects interruption of the input information INF in the second mode M2 before a lapse of the signal determination time T1 from generating the control signal CS11 or CS12. The controller 20 is configured to generate the control signal CS13 in response to changing the mode from the waiting mode M22 to the activating mode M21.

The controller 20 is configured to change the mode from the activating mode M21 to the sleep mode M23 if the controller 20 generates the control signal CS13 after the controller 20 detects the interruption of the input information INF in the second mode M2. The controller 20 is configured to change the mode from the activating mode M21 to the sleep mode M23 in response to completion of generating the control signal CS13.

The controller 20 is configured to change the mode of the controller 20 from the sleep mode M23 to the activating mode M21 in response to the input information INF, specifically the user input U1, in the sleep mode M23. The controller 20 is configured to change the mode from the sleep mode M23 to the activating mode M21 if the electric switch SW1 is turned on in the sleep mode M23. The controller 20 is configured to enter the activating mode M21 if the electric switch SW1 is turned on in the sleep mode M23. Specifically, the controller 20 is configured to change the mode the sleep mode M23 to the activating mode M21 if the controller 20 detects the user input U1 within a determination time T2 in the sleep mode M23. The controller 20 is configured to generate the control signal CS11 in response to changing the mode from the sleep mode M23 to the activating mode M21. The controller 20 is configured to change the mode from the activating mode M21 to the waiting mode M22 in response to completion of generating the control signal CS11. The controller 20 is configured to generate the control signal CS12 or CS13 in accordance with an input state of the user input U1 after generating the control signal CS11.

Figure 6:
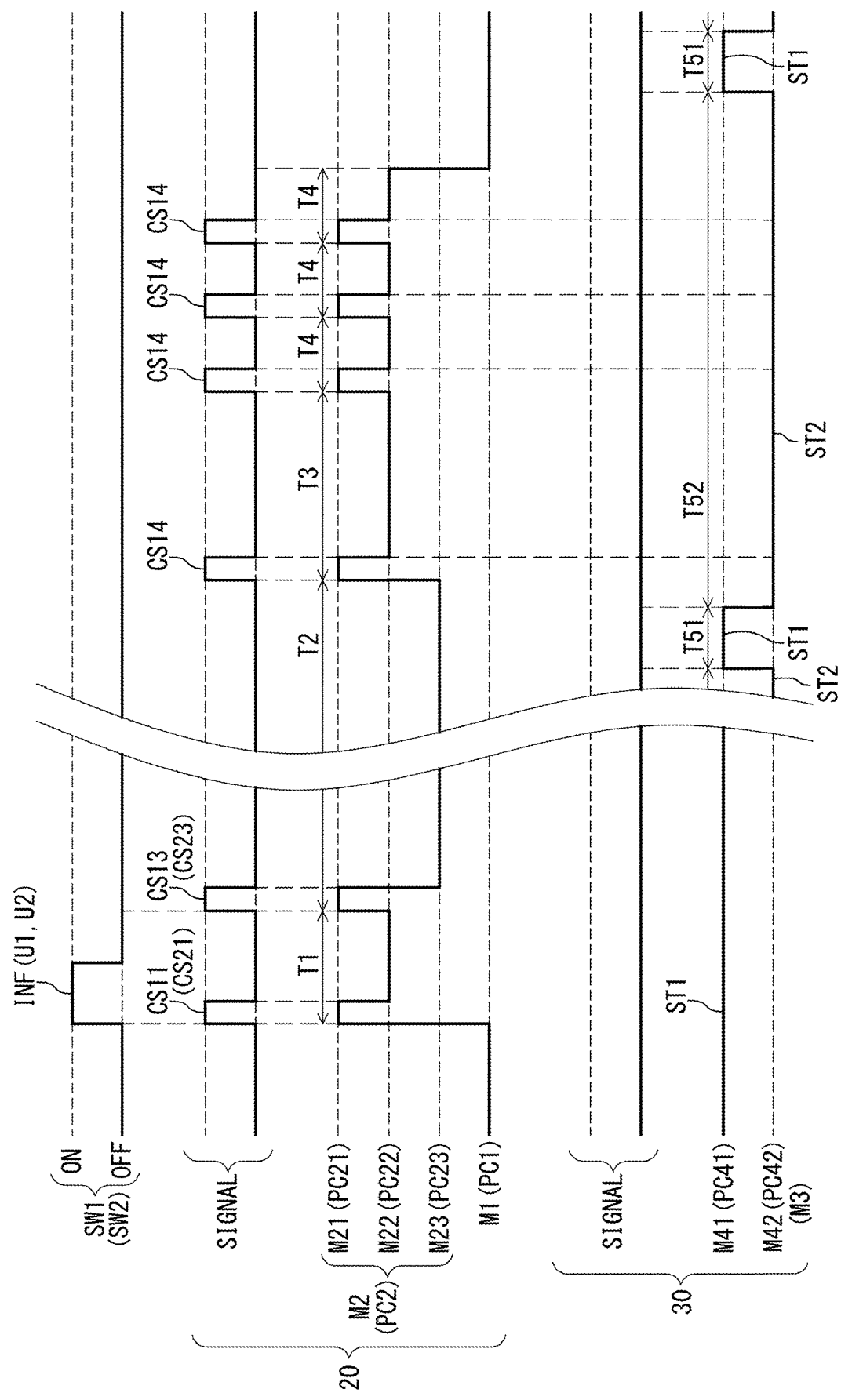
FIGS. 6 to 9 are timing charts showing the control of the human-powered vehicle illustrated in FIG. 1.

As seen in FIG. 6, the controller 20 is configured to change the mode from the second mode M2 to the first mode M1 if the controller 20 does not detect the input information INF for the determination time T2 or T3 in the second mode M2. The controller 20 is configured to change the mode from the sleep mode M23 to the first mode M1 through another mode if the controller 20 does not detect the input information INF for the determination time T2 or T3 in the second mode M2. The input information INF includes the user input U1, the user input U2, and an acknowledge signal CS3 (see e.g., FIG. 7) transmitted from the additional device RD.

The controller 20 is configured to change the mode from the second mode M2 to the first mode M1 if the controller 20 does not detect the user input U1 for the determination time T2 in the second mode M2. The controller 20 is configured to change the mode from the sleep mode M23 to the first mode M1 if the controller 20 does not detect the input information INF for the determination time T2 in the sleep mode M23. The controller 20 is configured to change the mode from the sleep mode M23 to the first mode M1 through another mode if the controller 20 does not detect the user input U1 for the determination time T2 in the sleep mode M23 and if the additional device RD is in a predetermined mode M3.

In the present disclosure, the controller 20 is configured to determine whether the additional device RD is in the predetermined mode M3 based on the input information INF. The controller 20 is configured to determine whether the additional device RD is in the predetermined mode M3 based on the input information INF before changing the mode from the second mode M2 to the first mode M1 if the controller 20 does not detect the user input U1 for the determination time T2 in the second mode M2. The controller 20 is configured to change the mode from the second mode M2 to the first mode M1 if the controller 20 concludes that the additional device RD is in the predetermined mode M3. Namely, the controller 20 is configured to change the mode from the second mode M2 to the first mode M1 if the controller 20 does not detect the input information INF for the determination time T2 in the sleep mode M23 and if the controller 20 concludes that the additional device RD is in the predetermined mode M3.

The controller 20 is configured to generate a check signal CS14 in the second mode M2 so as to determine whether the additional device RD is in the predetermined mode M3. The controller 20 is configured to generate the check signal CS14 in the second mode M2 so as to determine whether the additional device RD is in the predetermined mode M3 if the controller 20 does not detect the user input U1 for the determination time T2 in the sleep mode M23. The controller 20 is configured to change the mode from the sleep mode M23 to the activating mode M21 if the controller 20 does not detect the user input U1 for the determination time T2 in the sleep mode M23. The controller 20 is configured to generate the check signal CS14 in response to changing the mode from the sleep mode M23 to the activating mode M21. The controller 20 is configured to change the mode from the activating mode M21 to the waiting mode M22 in response to completion of generating the check signal CS14.

Figure 7:
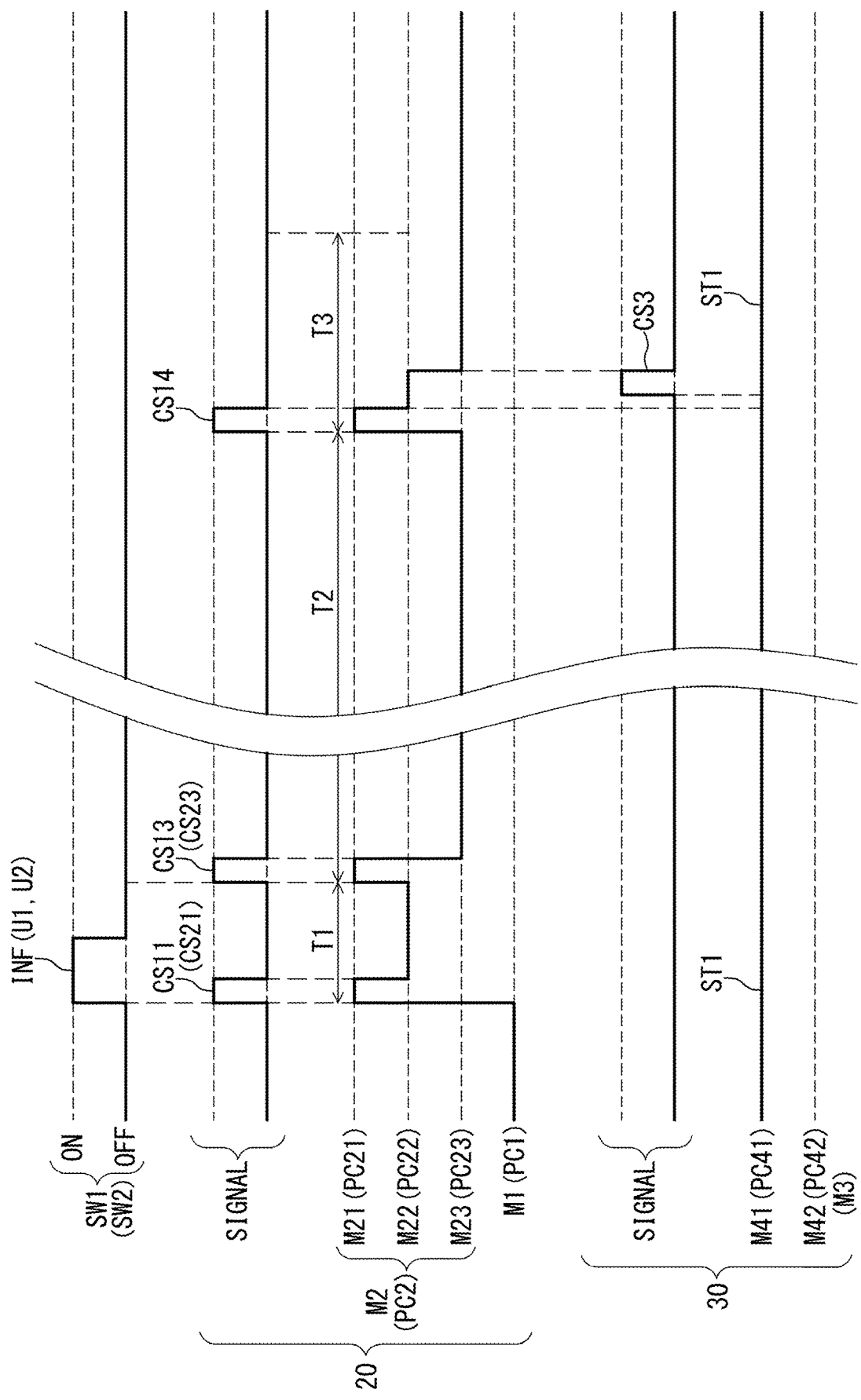

As seen in FIG. 7, the controller 20 is configured to maintain the second mode M2 if the controller 20 detects the input information INF for the determination time T2 or T3 in the second mode M2. The controller 20 is configured to change the mode from the waiting mode M22 to the sleep mode M23 if the controller 20 detects the acknowledge signal CS3. The additional device RD is configured to return the acknowledge signal CS3 to the operating device 10 in response to the check signal CS14 transmitted from the operating device 10. The additional device RD has a continuous confirmation mode M41 in which the additional device RD is configured to continuously confirm signals such as the control signals CS11, CS12 and CS13 and the check signal CS14. In the continuous confirmation mode M41, the additional device RD is configured to maintain, during the continuous confirmation mode M41, a responsive state ST1 in which the additional device RD is configured to respond the check signal CS14 transmitted by the controller 20. Thus, the additional device RD is configured to return the acknowledge signal CS3 to the operating device 10 in response to the check signal CS14 in the continuous confirmation mode M41.

Figure 8:
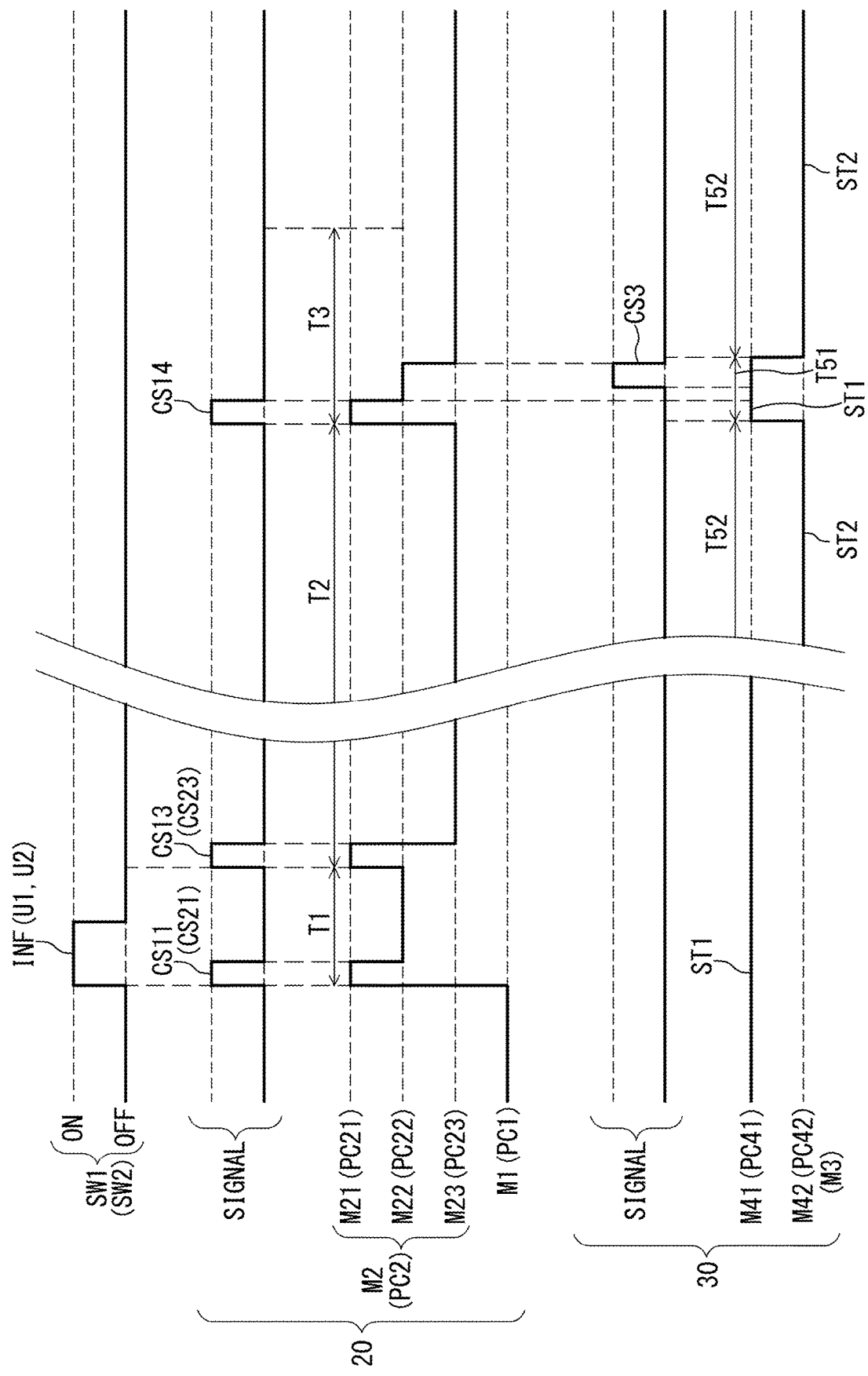

As seen in FIGS. 6 and 8, the additional device RD has an intermittent confirmation mode M42 in which the additional device RD is configured to intermittently confirm the check signal CS14. The predetermined mode M3 includes the intermittent confirmation mode M42. As seen in FIG. 8, in the intermittent confirmation mode M42, the additional device RD is configured to maintain, for a predetermined time T51 at regular intervals, the responsive state ST1 in which the additional device RD is configured to respond the check signal CS14 transmitted by the controller 20. As seen in FIG. 6, in the intermittent confirmation mode M42, the additional device RD is configured to maintain, for a predetermined time T52 at regular intervals, a non-responsive state ST2 in which the additional device RD is configured not to detect the check signal CS14 transmitted by the controller 20. The additional device RD is configured to alternatingly repeat the responsive state ST1 and the non-responsive state ST2 in the intermittent confirmation mode M42. The predetermined time T52 of the non-responsive state ST2 is longer than the predetermined time T51 of the responsive state ST1. Power consumption PC42 of the non-responsive state ST2 is lower than power consumption PC41 of the responsive state ST1. Thus, power consumption of the intermittent confirmation mode M42 is lower than power consumption of the continuous confirmation mode M41. As seen in FIGS. 6 and 8, the additional device RD is configured to return the acknowledge signal CS3 to the operating device 10 in response to the check signal CS14 only in the responsive state ST1.

Figure 9:
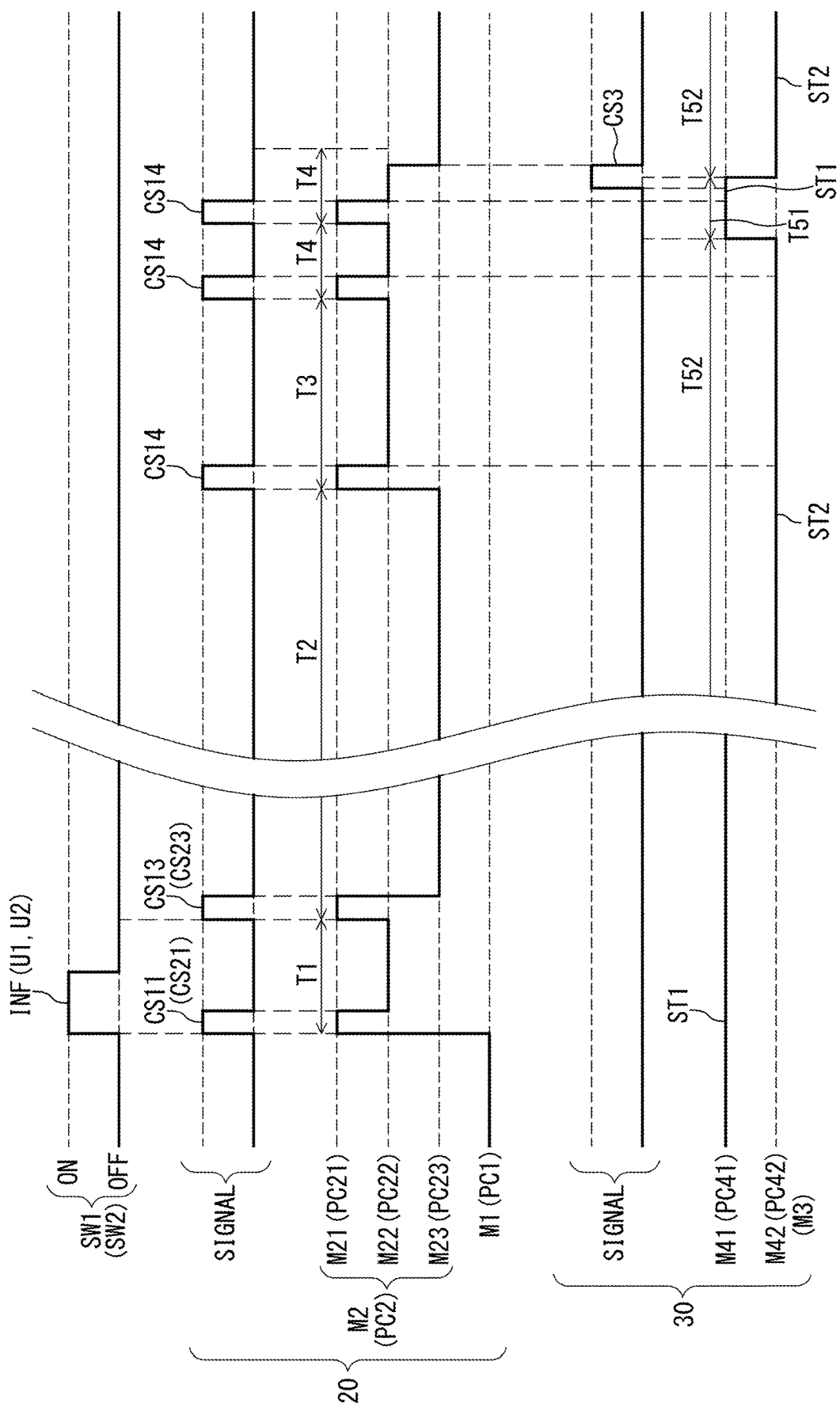

As seen in FIGS. 6 and 9, the controller 20 is configured to repeatedly generate and transmit the check signal CS14 at predetermined number of times if the controller 20 does not detect the acknowledge signal CS3 for the determination time T3 in the waiting mode M22. The controller 20 is configured to determine whether the controller 20 receives the acknowledge signal CS3 from the additional device RD within a determination time T4 from generating the check signal CS14 while the controller 20 repeatedly generates and transmits the check signal CS14. The predetermined time T52 of the non-responsive state ST2 is longer than the determination times T3 and T4. The determination time T4 is shorter than the determination time T3. However, the determination time T4 can be equal to or longer than the determination time T3.

As seen in FIG. 9, the controller 20 is configured to maintain the second mode M2 if the controller 20 detects the acknowledge signal CS3 while the controller 20 repeatedly generates and transmits the check signal CS14. Specifically, the controller 20 is configured to change the mode from the waiting mode M22 to the sleep mode M23 if the controller 20 detects the acknowledge signal CS3 while the controller 20 repeatedly generates and transmits the check signal CS14 at the predetermined number of times.

As seen in FIG. 6, the controller 20 is configured to change the mode from the waiting mode M22 to the first mode M1 if the controller 20 does not detect the acknowledge signal CS3 while the controller 20 repeatedly generates and transmits the check signal CS14 at the predetermined number of times. However, the controller 20 can be configured to change the mode from the waiting mode M22 to the first mode M1 if the controller 20 does not detect the acknowledge signal CS3 for the determination time T3 in the waiting mode M22 without repeatedly generating the check signal CS14.

The description regarding the control signals CS11, CS12, and CS13 can be utilized as the description regarding the control signal CS21, CS22, and CS23 by replacing the reference numerals "SW1," "U1," "CS11," "CS12," and "CS13" with the reference numerals "SW2," "U2," "CS21," "CS22," and "CS23." Thus, they will not be described in detail here for the sake of brevity.

As seen in FIGS. 2 and 3, the operating device 12 has substantially the same structure as that of the operating device 10. For example, the operating device 12 is configured to communicate with the additional device RD to operate the additional device FD. Thus, it will not be described in detail for the sake of brevity.

As seen in FIG. 3, the additional device RD includes an additional controller 30. The additional controller 30 is configured to be communicate with the operating device 10, the operating device 12, the additional device RD, and the additional device FD. The additional controller 30 has the continuous confirmation mode M41 and the intermittent confirmation mode M42. In the present disclosure, the additional controller 30 is configured to be mounted to the additional device RD. However, the additional controller 30 can be mounted to another device such as the additional device FD, the power supply PS, and the junction J1.

The additional controller 30 includes a processor 30P, a memory 30M, a circuit board 30B, and a system bus 30D. The processor 30P and the memory 30M are electrically mounted on the circuit board 30B. The processor 30P includes a CPU and a memory controller. The memory 30M is electrically connected to the processor 30P. The memory 30M includes a ROM and a RAM. The memory 30M includes storage areas each having an address in the ROM and the RAM. The processor 30P is configured to control the memory 30M to store data in the storage areas of the memory 30M and reads data from the storage areas of the memory 30M. The memory 30M (e.g., the ROM) stores a program. The program is read into the processor 30P, and thereby the configuration and/or algorithm of the additional controller 30 is performed.

The additional controller 30 includes an additional communicator 30C. The additional communicator 30C is configured to communicate with the communicator 20C of the controller 20 of the operating device 10. The additional communicator 30C is configured to communicate with the operating device 12. The additional communicator 30C is configured to receive the control signals CS11, CS12 and CS13 and the check signal CS14 from the operating device 10 in the responsive state ST1 (see, e.g., FIGS. 6 to 9) of both the continuous confirmation mode M41 and the intermittent confirmation mode M42. In the present disclosure, the additional communicator 30C includes an additional wireless communicator WC2 configured to wirelessly communicate with another device. The additional wireless communicator WC2 is configured to wirelessly receive the control signals CS11, CS12 and CS13 and the check signal CS14 from the wireless communicator WC1 of the operating device 10 in the responsive state ST1 (see, e.g., FIGS. 6 to 9). The additional wireless communicator WC2 is configured to wirelessly transmit information to another device.

The additional wireless communicator WC2 is electrically mounted on the circuit board 30B. The additional wireless communicator WC2 is electrically connected to the processor 30P and the memory 30M with the circuit board 30B and the system bus 30D. The additional wireless communicator WC2 includes a signal transmitting circuit WC21, a signal receiving circuit WC22, and an antenna WC23 electrically connected to the signal transmitting circuit WC21 and the signal receiving circuit WC22. The signal transmitting circuit WC21, the signal receiving circuit WC22, and the antenna WC23 are electrically mounted on the circuit board 30B. Thus, the additional wireless communicator WC2 can also be referred to as an additional wireless communication circuit or circuitry WC2.

The signal transmitting circuit WC21, the signal receiving circuit WC22, and the antenna WC23 have substantially the same structures of the signal transmitting circuit WC11, the signal receiving circuit WC12, and the antenna WC13 of the wireless communicator WC1, respectively. Thus, they will not be described in detail here for the sake of brevity.

The additional controller 30 further comprises an additional notifier 30N. The additional notifier 30N is configured to notify a user of a status of the additional device RD. The additional notifier 30N is configured to notify a user of a status of the additional device RD. In the present disclosure, the additional notifier 30N is mounted to the circuit board 30B. For example, the additional notifier 30N includes an indicator such as a light-emitting diode. The additional notifier 30N is configured to indicate the status of the additional device RD with light. Examples of the status of the additional device RD includes a state of communication between the additional controller 30 and another device (e.g., the operating device 10), a mode of the additional controller 30, and a remaining level of the power supply PS.

The additional controller 30 is configured to manage the power use of hardware in the additional device RD. The additional controller 30 is configured to control supply of electricity to each of the processor 30P, the memory 30M, the wireless communicator WC2, the additional notifier 30N, and other electric components installed in the additional device RD. The additional controller 30 is configured to separately control supply of electricity to each of the signal transmitting circuit WC21, the signal receiving circuit WC22, the antenna WC23, and the additional notifier 30N. Thus, the additional controller 30 has a plurality of modes having different power consumption. For example, the additional controller 30 has the continuous confirmation mode M41 and the intermittent confirmation mode M42. Power consumption under the intermittent confirmation mode M42 is lower than power consumption under the continuous confirmation mode M41.

As seen in FIG. 3, the additional device RD includes a base member RD1, a chain guide RD2, an actuator RD3, a position sensor RD4, and an actuator driver RD5. The base member RD1 is mounted to the frame VH1 (see e.g., FIG. 1). The chain guide RD2 is movably coupled to the base member RD1 and is configured to engage with the chain C. The actuator RD3 is configured to move the chain guide RD2 relative to the base member RD1 to shift the chain C relative to the rear sprocket assembly RS.

The actuator driver RD5 is electrically connected to the actuator RD3 to control the actuator RD3 based on the control signals CS11, CS12, CS21, and CS22 transmitted from the operating device 10 through the additional controller 30. Examples of the actuator RD3 include a direct-current (DC) motor and a stepper motor. The actuator RD3 includes a rotational shaft operatively coupled to the chain guide RD2. The position sensor RD4 is configured to sense a current gear position of the additional device RD. Examples of the position sensor RD4 include a potentiometer and a rotary encoder. The position sensor RD4 is configured to sense an absolute rotational position of the rotational shaft of the actuator RD3 as the current gear position of the additional device RD. The actuator RD3 and the position sensor RD4 are electrically connected to the actuator driver RD5.

The actuator driver RD5 is configured to control the actuator RD3 to move the chain guide RD2 relative to the base member RD1 by one gear position in an upshift direction based on the control signal CS11 or CS12 and the current gear position sensed by the position sensor RD4. The actuator driver RD5 is configured to control the actuator RD3 to move the chain guide RD2 relative to the base member RD1 by one gear position in a downshift direction based on the control signal CS21 or CS22 and the current gear position sensed by the position sensor RD4. The actuator driver RD5 is configured to control the actuator RD3 to maintain the chain guide RD2 relative to the base member RD1 in a current position when the position sensor RD4 senses the control signal CS13.

As seen in FIG. 4, for example, the actuator driver RD5 controls the actuator RD3 to move the chain guide RD2 relative to the base member RD1 from a gear position GP1 to an adjacent gear position GP2 in response to the control signal CS11. The actuator driver RD5 controls the actuator RD3 to move the chain guide RD2 relative to the base member RD1 from the gear position GP2 to an adjacent gear position GP3 in response to the control signal CS12. The actuator driver RD5 controls the actuator RD3 to move the chain guide RD2 relative to the base member RD1 from the gear position GP3 to an adjacent gear position GP4 in response to the control signal CS12. However, the actuator driver RD5 controls the actuator RD3 to maintain the chain guide RD2 relative to the base member RD1 in the gear position GP4 when the position sensor RD4 senses the control signal CS13. The additional device FD has substantially the same structure as the structure of the additional device RD. Thus, it will not be described in detail here for the sake of brevity.

Figure 10:
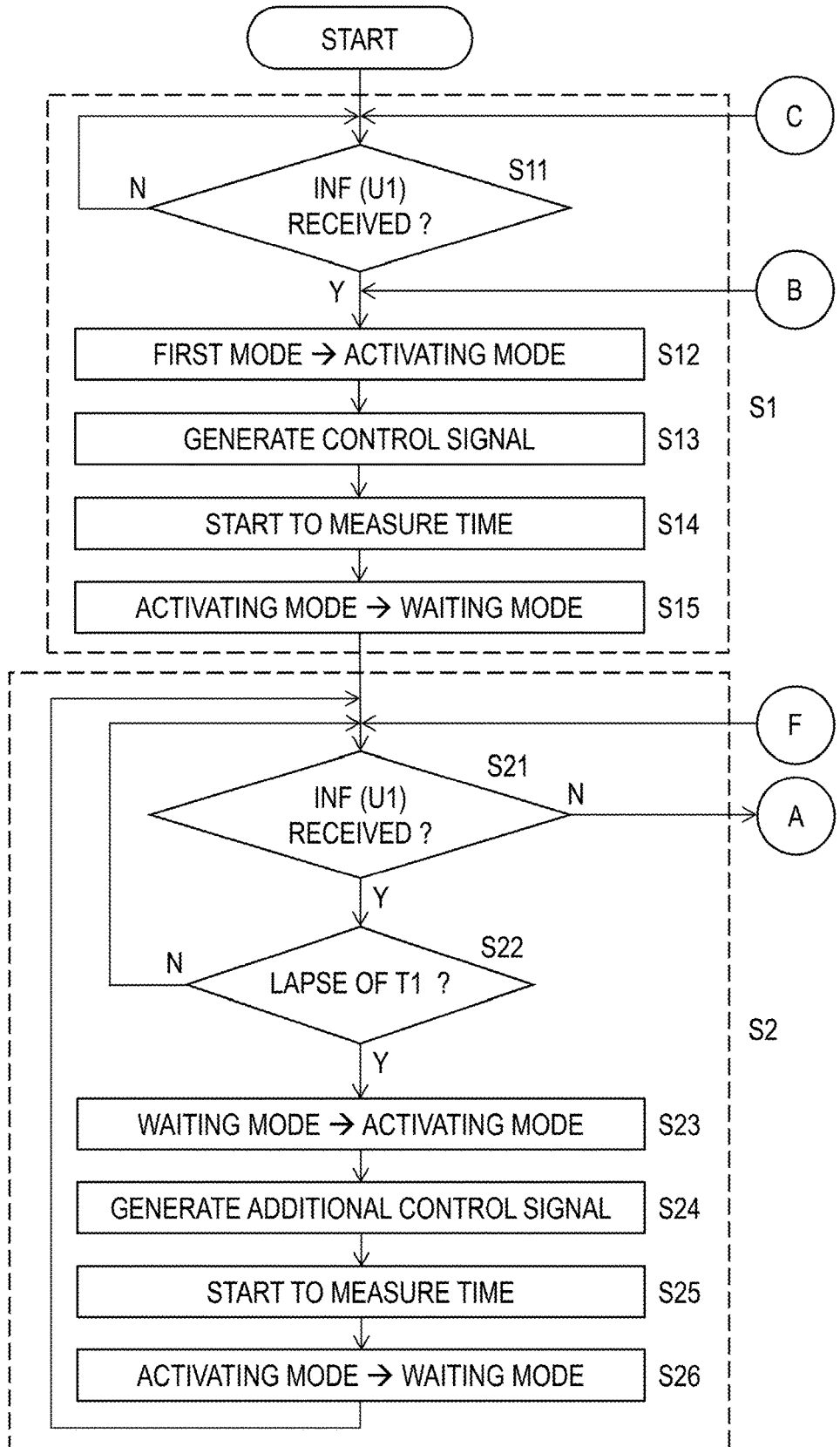
FIGS. 10 to 13 are flowcharts showing the control of the human-powered vehicle illustrated in FIG. 1.

The control of the operating device 10 will be described referring to FIGS. 10 to 13. As seen in FIG. 10, the controller 20 changes the mode between the first mode M1 and the second mode M2 in response to the input information INF (step S1). The controller 20 changes the mode from the first mode M1 to the activating mode M21 if the controller 20 receives the input information INF (here, the user input U1) in the first mode M1 (steps S11 and S12). Specifically, the controller 20 is powered on if the electric switch SW1 is turned on. The controller 20 generates and transmits the control signal CS11 in response to changing the mode from the first mode M1 to the activating mode M21 (step S13). The controller 20 starts to measure time to determine the lapse of the signal determination time T1 if the controller 20 receives the user input U1 in the first mode M1 (step S14). The controller 20 changes the mode from the activating mode M21 to the waiting mode M22 in response to completion of generating the control signal CS11 (step S15). The time measurement of the step S14 can start at an arbitrary timing in the mode change of the step S1 if needed and/or desired. For example, the time measurement of the step S14 can start at a timing different from the timing depicted in FIG. 10 (e.g., after the step S12 and before the step S13) if needed and/or desired. Furthermore, the time measurement of the step S14 can start at the same timing as that of the step S12, S13, or S15 if needed and/or desired.

The controller 20 changes the mode between the activating mode M21 and the waiting mode M22 at the constant interval while the controller 20 continuously detects the input information INF (here, the user input U1) in the second mode M2 (step S2). The controller 20 changes the mode from the waiting mode M22 to the activating mode M21 if the controller 20 concludes that the electric switch SW1 is continuously turned on for the signal determination time T1 after generating the control signal CS11 (steps S21 to S23). The controller 20 generates and transmits the control signal CS12 in response to changing the mode from the waiting mode M22 to the activating mode M21 (step S24). The controller 20 starts to measure time to determine the lapse of the signal determination time T1 if the controller 20 continuously detects the user input U1 in the second mode M2 (step S25). The controller 20 changes the mode from the activating mode M21 to the waiting mode M22 in response to completion of generating the control signal CS12 (step S26). The steps S21 to S26 are repeatedly executed while the controller 20 continuously detects the user input U1. The time measurement of the step S25 can start at an arbitrary timing in the mode change of the step S2 if needed and/or desired. For example, the time measurement of the step S25 can start at a timing different from the timing depicted in FIG. 10 (e.g., after the step S23 and before the step S24) if needed and/or desired. Furthermore, the time measurement of the step S25 can start at the same timing as that of the step S23, S24, or S26 if needed and/or desired.

Figure 11:
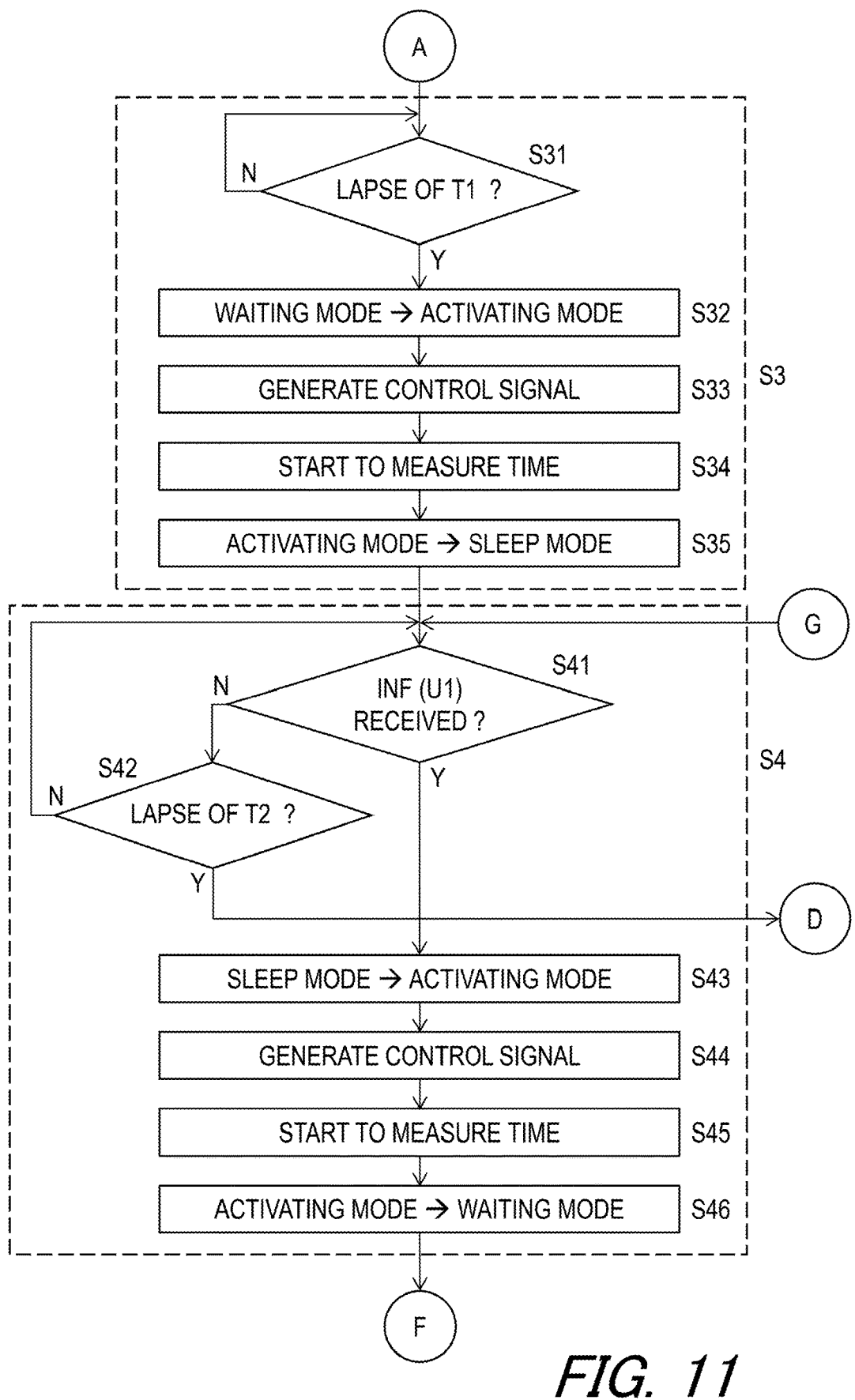

As seen in FIG. 11, the controller 20 changes the mode from the waiting mode M22 to the activating mode M21 if the controller 20 detects interruption of the input information INF in the second mode M2 (steps S21 and S3). The controller 20 changes the mode from the waiting mode M22 to the activating mode M21 if the controller 20 detects interruption of the input information INF in the second mode M2 before the lapse of the signal determination time T1 from generating the control signal CS11 or CS12 (steps S31 and S32). The controller 20 generates and transmits the control signal CS13 in response to changing the mode from the waiting mode M22 to the activating mode M21 (step S33). The controller 20 resets the determination time T2 and starts to measure the determination time T2 (step S34). The controller 20 changes the mode from the activating mode M21 to the sleep mode M23 if the controller 20 generates and transmits the control signal CS13 after the controller 20 detects the interruption of the input information INF in the second mode M2 (e.g., the waiting mode M22) (steps S21 and S35). Specifically, the controller 20 changes the mode from the activating mode M21 to the sleep mode M23 in response to completion of generating the control signal CS13 (step S35). The time measurement of the step S34 can start at an arbitrary timing in the mode change of the step S1 if needed and/or desired. For example, the time measurement of the step S34 can start at a timing different from the timing depicted in FIG. 11 (e.g., after the step S32 and before the step S33) if needed and/or desired. Furthermore, the time measurement of the step S34 can start at the same timing as that of the step S32, S33, or S35 if needed and/or desired.

Figure 12:
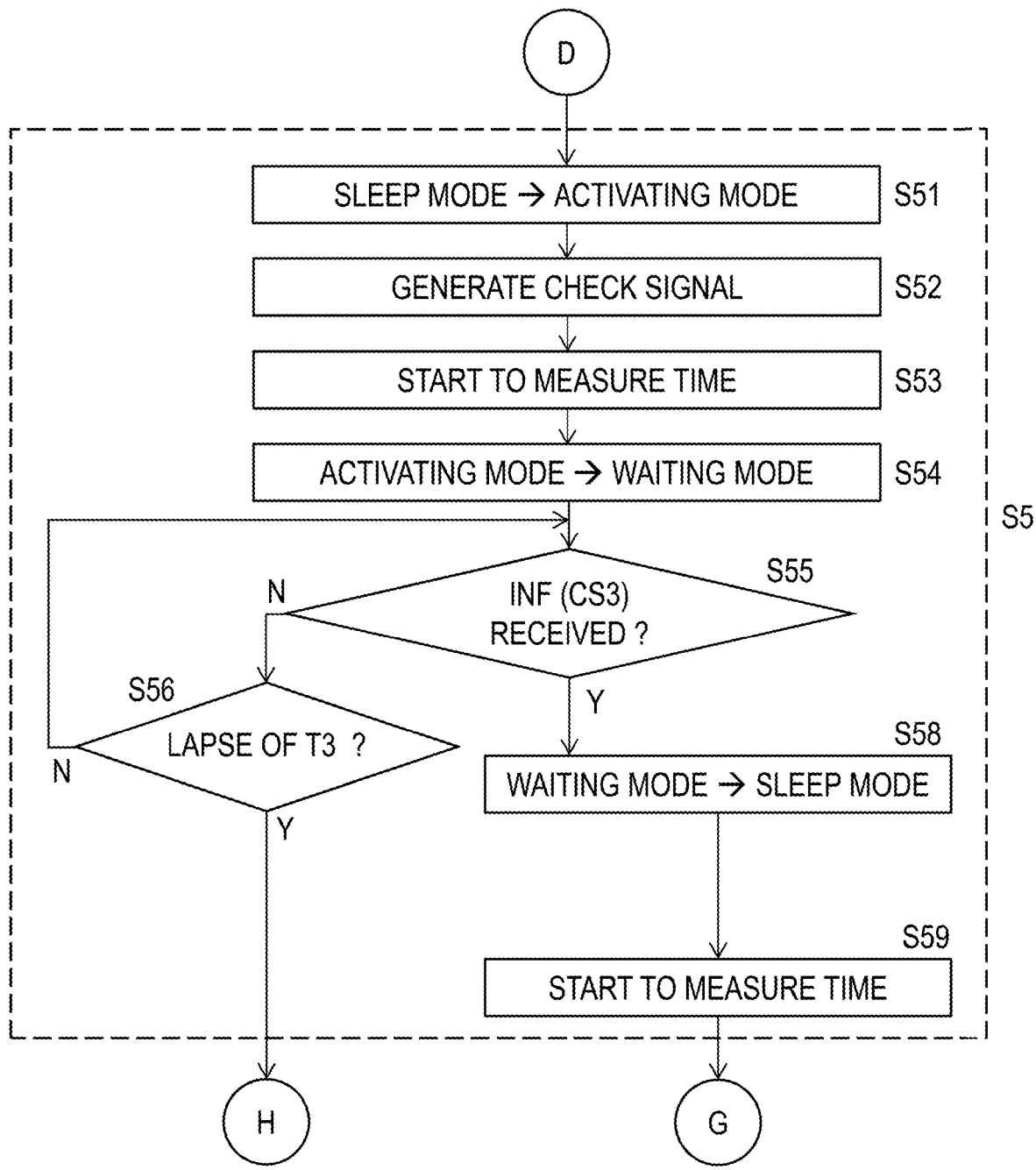

As seen in FIGS. 11 and 12, the controller 20 changes the mode from the second mode M2 (here, the sleep mode M23) to the first mode M1 if the controller 20 does not detect the input information INF for the determination time T2 or T3 in the second mode M2 (steps S4 and S5). The controller 20 determines whether the additional device RD is in the predetermined mode M3 based on the input information INF (step S5).

As seen in FIG. 11, the controller 20 changes the mode of the controller 20 from the sleep mode M23 to the activating mode M21 in response to the input information INF (step S4). Specifically, the controller 20 changes the mode from the sleep mode M23 to the activating mode M21 in response to the user input U1 in the sleep mode M23 (steps S41 and S42). The controller 20 changes the mode from the sleep mode M23 to the activating mode M21 if the electric switch SW1 is turned on in the sleep mode M23 before the lapse of the determination time T2 from generating the control signal CS13 (steps S41 to S43). The controller 20 generates and transmits the control signal CS11 in response to changing the mode from the sleep mode M23 to the activating mode M21 (step S44). The controller 20 starts to measure time to determine the lapse of the signal determination time T1 (step S45). The controller 20 changes the mode from the activating mode M21 to the waiting mode M22 in response to completion of generating the control signal CS11 (step S46). The process returns to the step S3 after the mode is changed from the activating mode M21 to the waiting mode M22. The time measurement of the step S45 can start at an arbitrary timing in the mode change of the step S2 if needed and/or desired. For example, the time measurement of the step S45 can start at a timing different from the timing depicted in FIG. 11 (e.g., after the step S43 and before the step S44) if needed and/or desired. Furthermore, the time measurement of the step S45 can start at the same timing as that of the step S43, S44, or S46 if needed and/or desired.

As seen in FIGS. 11 and 12, in order to generate the check signal CS14, the controller 20 changes the mode from the sleep mode M23 to the activating mode M21 if the controller 20 does not detect the user input U1 for the determination time T2 in the sleep mode M23 (steps S41, S42, and S51). As seen in FIG. 12, the controller 20 generates and transmits the check signal CS14 in response to changing the mode from the sleep mode M23 to the activating mode M21 (step S52). The controller 20 starts to measure time to determine the lapse of the determination time T3 (step S53). The controller 20 changes the mode from the activating mode M21 to the waiting mode M22 in response to completion of generating the check signal CS14 (step S54). The time measurement of the step S53 can start at an arbitrary timing in the mode change of the step S1 if needed and/or desired. For example, the time measurement of the step S53 can start at a timing different from the timing depicted in FIG. 12 (e.g., after the step S51 and before the step S52) if needed and/or desired. Furthermore, the time measurement of the step S53 can start at the same timing as that of the step S51, S52, or S54 if needed and/or desired.

As seen in FIG. 12, the controller 20 determines whether the controller 20 receives the acknowledge signal CS3 from the controller 30 of the additional device RD within the determination time T3 from generating the check signal CS14 (steps S55 and S56). The controller 20 maintains the second mode M2 if the controller 20 detects the acknowledge signal CS3 within the determination time T3 in the waiting mode M22 (steps S55 and S58). Specifically, the controller 20 changes the mode from the waiting mode M22 to the sleep mode M23 if the controller 20 detects the acknowledge signal CS3 within the determination time T3 in the waiting mode M22 (steps S55 and S58). The controller 20 starts to measure time to determine the lapse of the determination time T2 (step S59). The process returns to the step S4. The time measurement of the step S59 can start at an arbitrary timing in the mode change of the step S5 if needed and/or desired. For example, the time measurement of the step S59 can start at a timing different from the timing depicted in FIG. 12 (e.g., before the step S58) if needed and/or desired. Furthermore, the time measurement of the step S59 can start at the same timing as that of the step S58 if needed and/or desired.

The controller 20 repeatedly generates and transmits the check signal CS14 at predetermined number of times if the controller 20 does not detect the acknowledge signal CS3 for the determination time T3 in the waiting mode M22 (steps S55 and S56). Specifically, the process enters the step S6 illustrated in FIG. 13.

Figure 13:
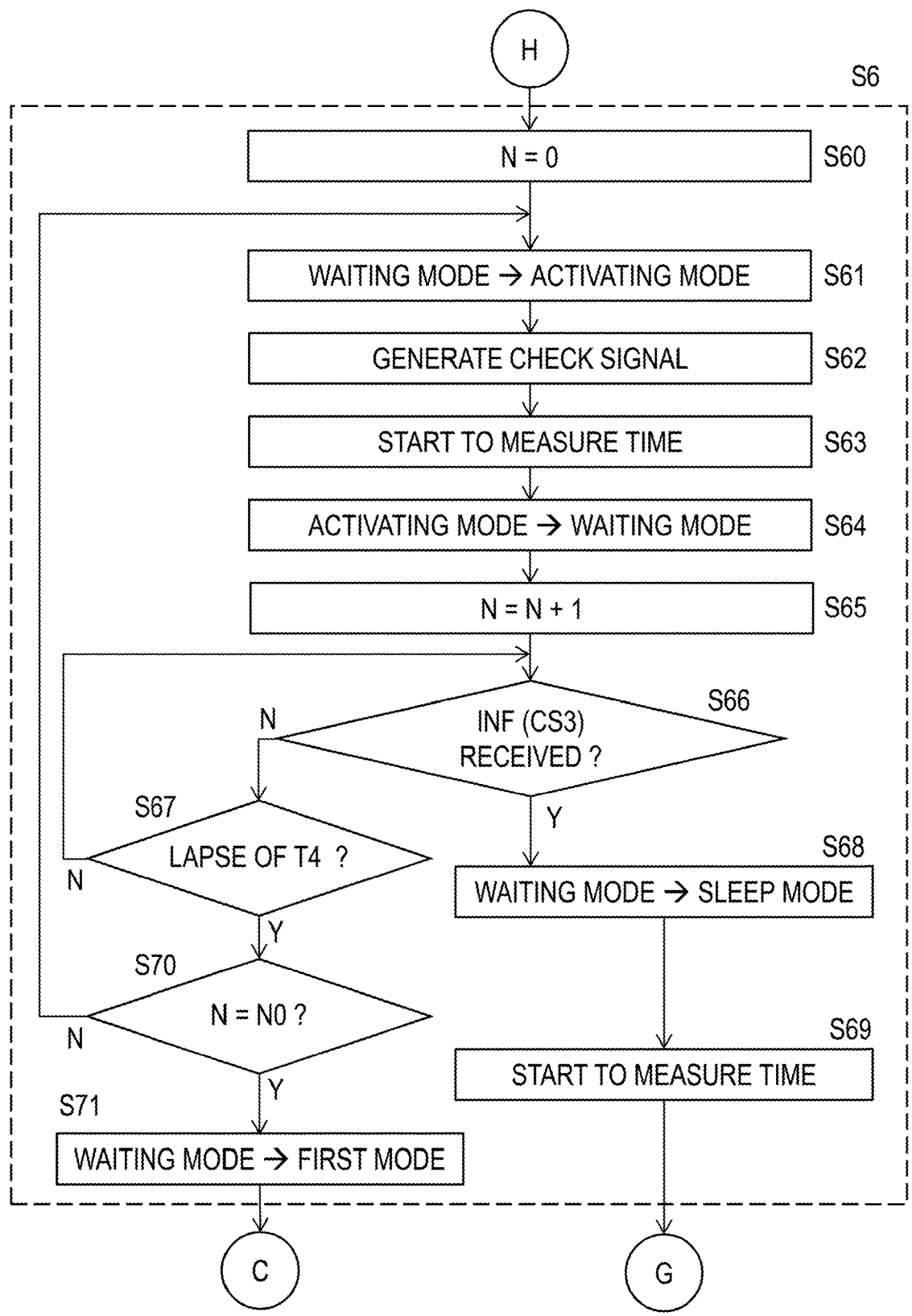

As seen in FIGS. 12 and 13, the controller 20 resets a count value N to zero if the controller 20 does not detect the acknowledge signal CS3 for the determination time T3 in the waiting mode M22 (steps S55, S56, and S60). As seen in FIG. 13, the controller 20 changes the mode from the waiting mode M22 to the activating mode M21 (step S61). The controller 20 generates and transmits the check signal CS14 in response to changing the mode from the waiting mode M22 to the activating mode M21 (step S62). The controller 20 starts to measure time to determine the lapse of a determination time T4 (step S63). The controller 20 changes the mode from the activating mode M21 to the waiting mode M22 in response to completion of generating the check signal CS14 (step S64). The controller 20 increments the count value N by one (step S65).

As seen in FIG. 13, the controller 20 determines whether the controller 20 receives the acknowledge signal CS3 from the additional controller 30 of the additional device RD within the determination time T4 from generating the check signal CS14 (steps S66 and S67). The controller 20 maintains the second mode M2 if the controller 20 detects the acknowledge signal CS3 within the determination time T4 in the waiting mode M22 (steps S66 and S68). Specifically, the controller 20 changes the mode from the waiting mode M22 to the sleep mode M23 if the controller 20 detects the acknowledge signal CS3 within the determination time T4 in the waiting mode M22 (steps S66 and S68). The controller 20 starts to measure time to determine the lapse of the determination time T2 (step S69). The process returns to the step S4. The time measurement of the step S69 can start at an arbitrary timing in the mode change of the step S6 if needed and/or desired. For example, the time measurement of the step S69 can start at a timing different from the timing depicted in FIG. 13 (e.g., before the step S68) if needed and/or desired. Furthermore, the time measurement of the step S69 can start at the same timing as that of the step S68 if needed and/or desired.

As seen in FIG. 13, the controller 20 determines whether the count value N reaches a predetermined count value NO if the controller 20 does not detect the acknowledge signal CS3 for the determination time T4 in the waiting mode M22 (steps S66, S67, and S70). The controller 20 repeatedly executes the steps S61 to S67 if the count value N does not reach the predetermined count value NO (steps S67 and S70). The controller 20 changes the mode from the waiting mode M22 to the first mode M1 if the controller 20 concludes that the count value N reaches the predetermined count value NO (steps S70 and S71). The process returns to the step S1.

Modifications

Figure 14:
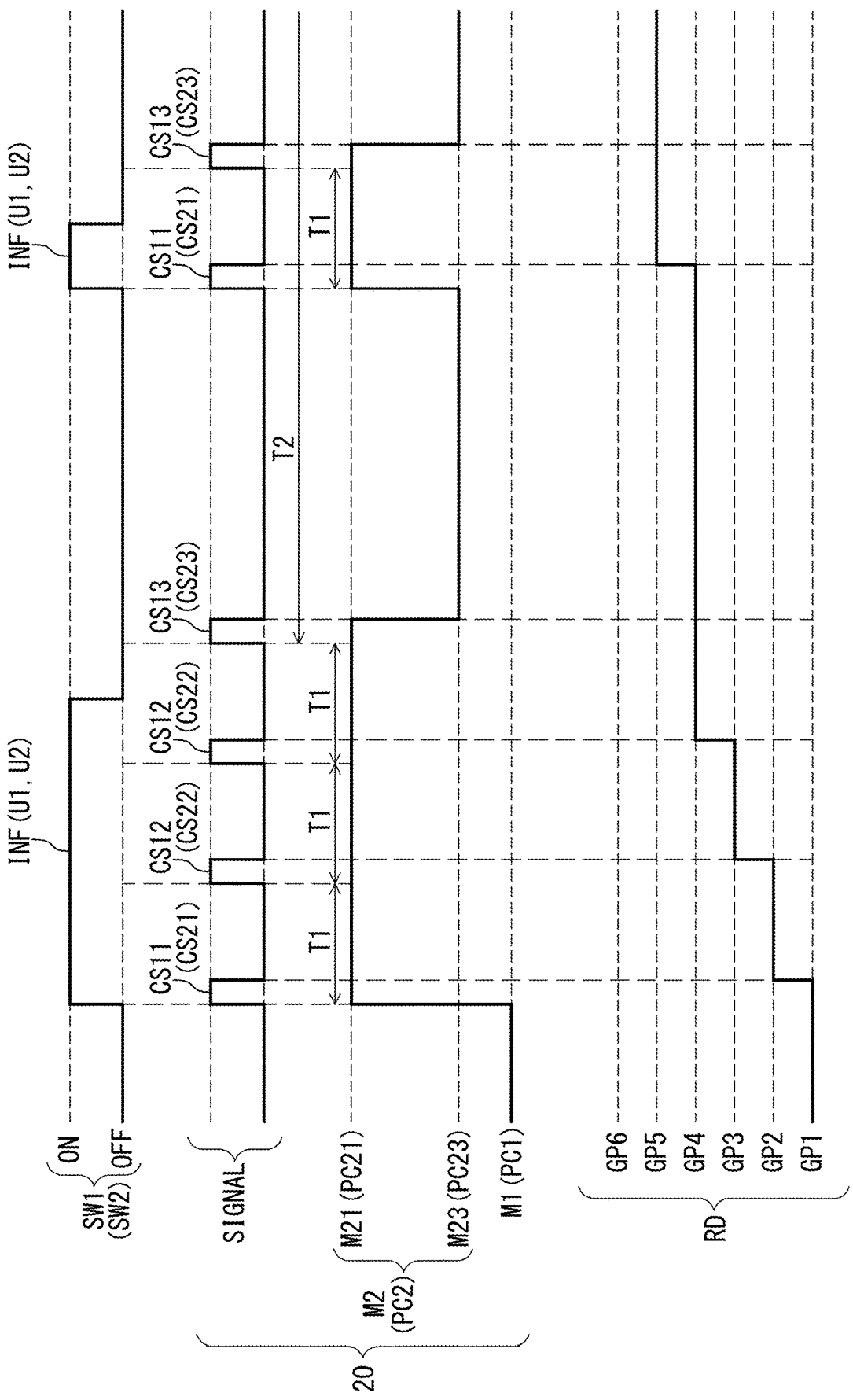
FIGS. 14 to 17 are flowcharts showing the control of the human-powered vehicle in accordance with modifications.
Figure 15:
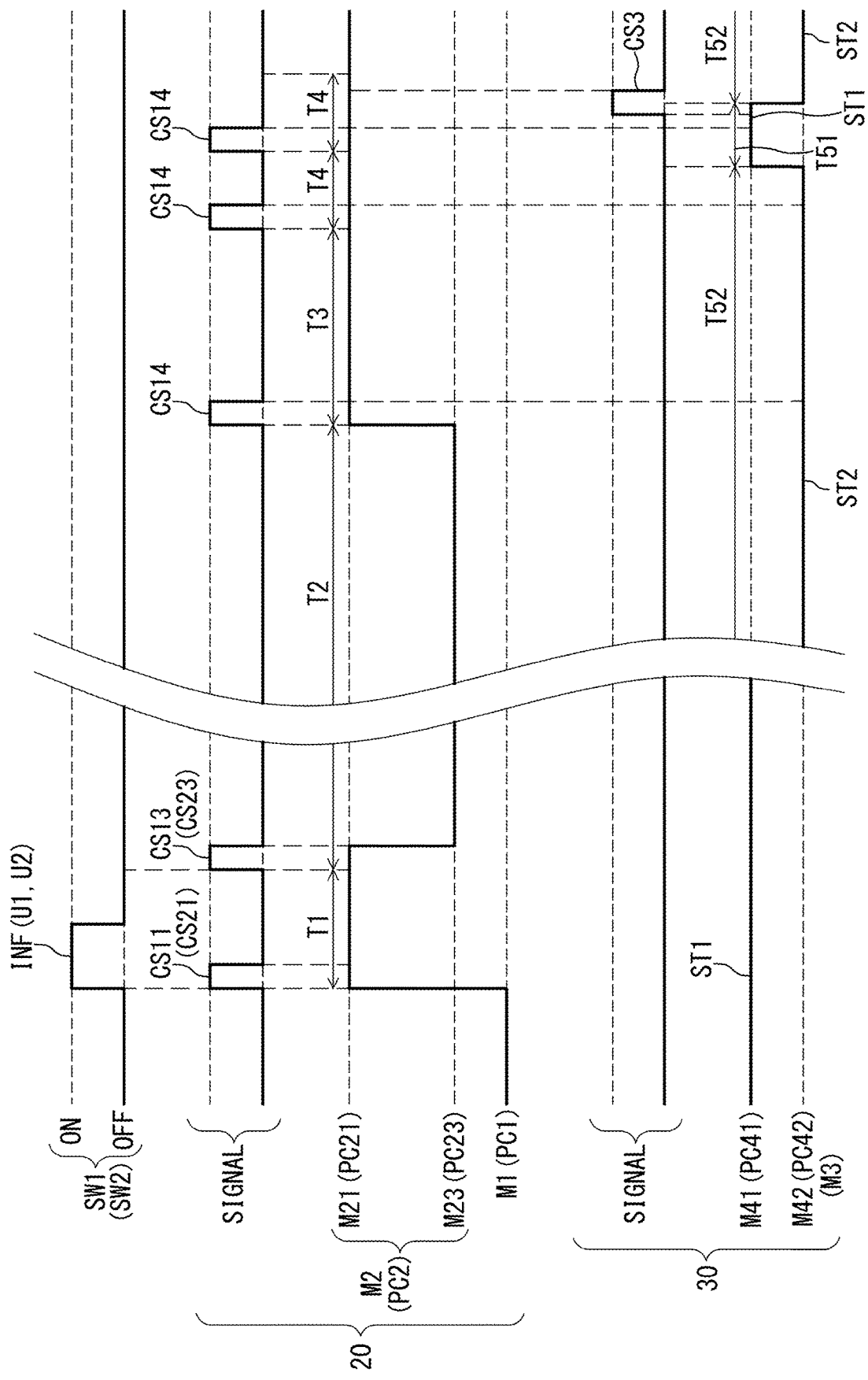
Figure 16:
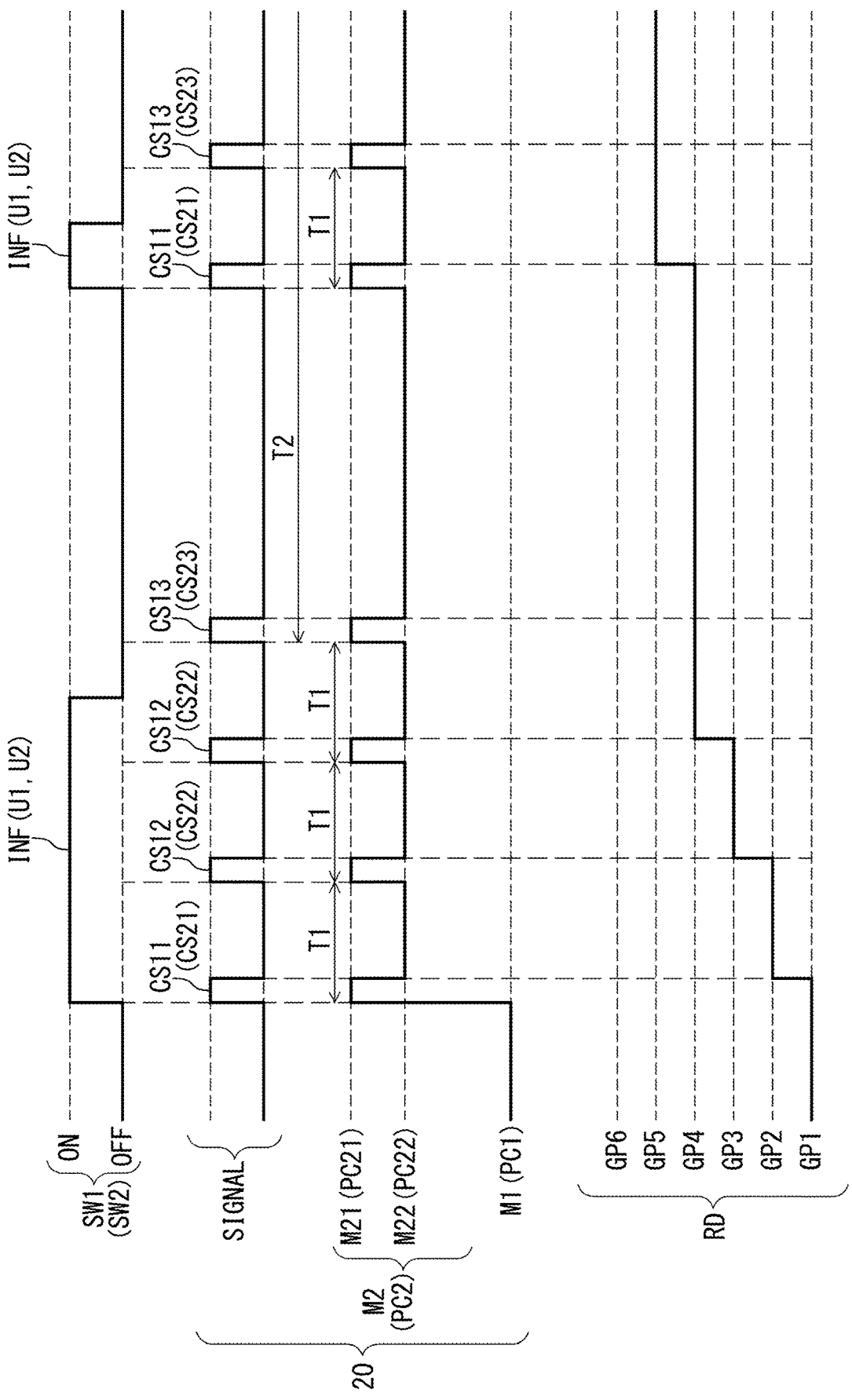
Figure 17:
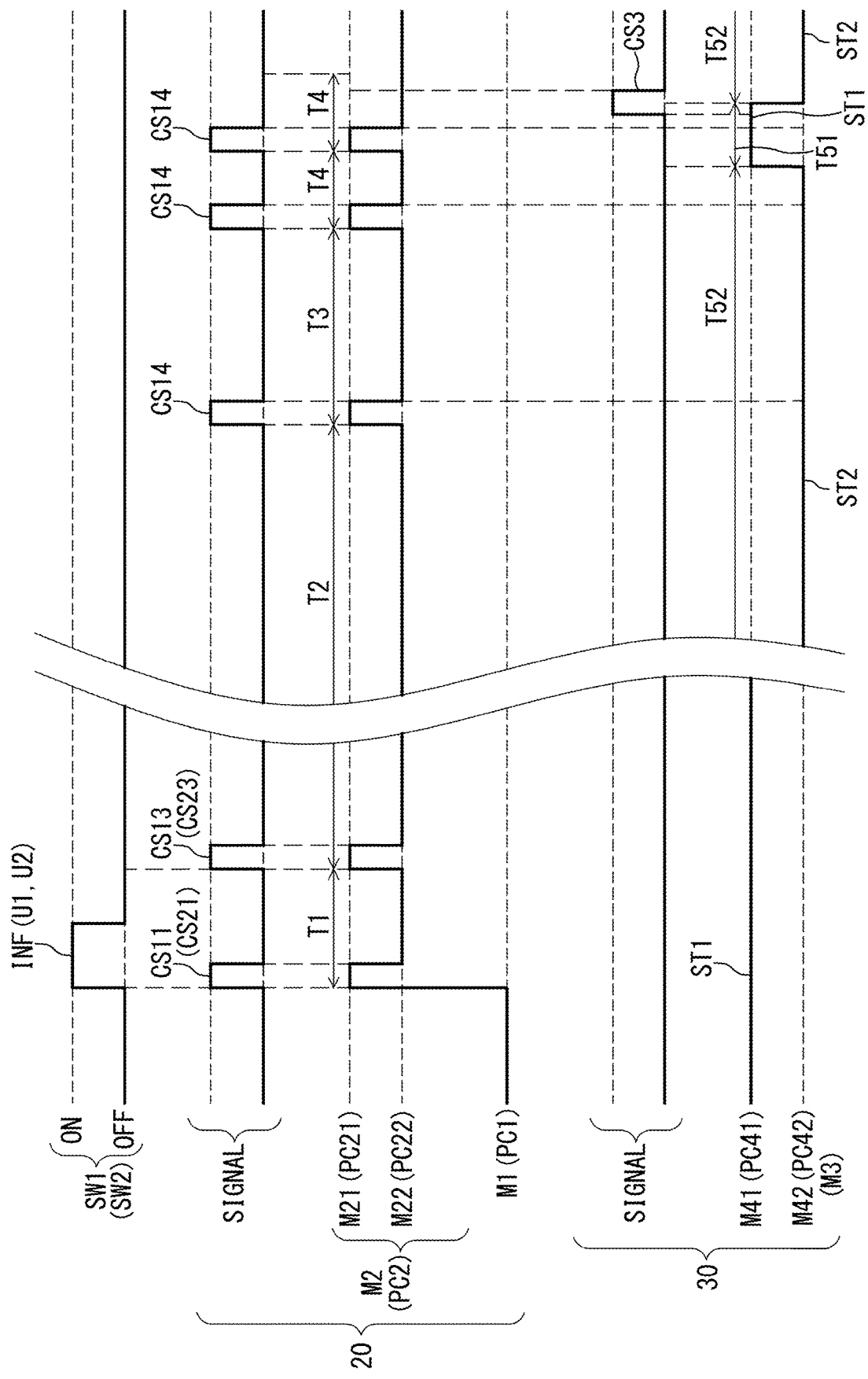

The controller 20 can have an additional mode (e.g., a pairing mode) other than the first and second modes M1 and M2. One or two mode of the activating mode M21, the waiting mode M22, and the sleep mode M23 can be omitted from the second mode M2. In other words, at least one of the activating mode M21, the waiting mode M22, and the sleep mode M23 can be merged into another of the activating mode M21, the waiting mode M22, and the sleep mode M23. For example, as seen in FIGS. 14 and 15, the waiting mode M22 can be merged into the activating mode M21 and omitted from the second mode M2. As seen in FIGS. 16 and 17, the sleep mode M23 can be merged into the waiting mode M22 and omitted from the second mode M2. The flowchart depicted in FIGS. 10 to 12 can be modified in accordance with the above modifications of the modes of the controller 20.

The controller 20 can be configured to change the mode from the second mode M2 to the first mode M1 if the controller 20 does not detect the input information INF for only one of the determination time T2 and the determination time T3 in the second mode M2. Namely, in FIGS. 11 and 12, at least one of steps S4 and S5 can be omitted from the flowchart of the controller 20. Furthermore, the step S6 depicted in FIG. 13 can be omitted from the flowchart of the controller 20.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other. The terms "a" (or "an"), "one or more" and "at least one" can be used interchangeably herein. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base member;
    an operating member movably coupled to the base member;
    an electric switch configured to receive a user input in response to a movement of the operating member to operate an additional device; and
    a controller configured to change a mode of the controller at least between
        a first mode in which the controller is configured to be under first power consumption, and
        a second mode in which the controller is configured to be under second power consumption different from the first power consumption.

2. The operating device according to claim 1, wherein the controller is configured to change the mode between the first mode and the second mode in response to input information.

3. The operating device according to claim 2, wherein the first power consumption is lower than the second power consumption, and
the controller is configured to change the mode from the first mode to the second mode in response to the input information.

4. The operating device according to claim 3, wherein the second power consumption includes waiting power consumption and activating power consumption higher than the waiting power consumption,
the first power consumption is lower than the waiting power consumption and the activating power consumption,
the second mode includes
    a waiting mode in which the operating device is under the waiting power consumption, and
    an activating mode in which the operating device is under the activating power consumption.

5. The operating device according to claim 4, wherein the controller is configured to change the mode from the first mode to the activating mode in response to the input information.

6. The operating device according to claim 5, wherein the controller is configured to generate a control signal in the activating mode.

7. The operating device according to claim 6, wherein the controller is configured to generate the control signal in response to changing the mode to the activating mode.

8. The operating device according to claim 6, wherein the controller is configured to change the mode from the activating mode to the waiting mode in response to completion of generating the control signal.

9. The operating device according to claim 4, wherein the controller is configured to change the mode between the activating mode and the waiting mode at a constant interval while the controller continuously detects the input information in the second mode.

10. The operating device according to claim 4, wherein the controller is configured to change the mode from the waiting mode to the activating mode if the controller detects interruption of the input information in the second mode.

11. The operating device according to claim 10, wherein
the second power consumption includes sleep power consumption higher than the first power consumption, the sleep power consumption being lower than the activating power consumption and the waiting power consumption,
the second mode includes a sleep mode in which the operating device is configured to be under the sleep power consumption, and
the controller is configured to change the mode from the activating mode to the sleep mode if the controller generates a control signal after the controller detects the interruption of the input information in the second mode.

12. The operating device according to claim 11, wherein
the controller is configured to change the mode of the controller from the sleep mode to the activating mode in response to the input information.

13. The operating device according to claim 11, wherein
the controller is configured to change the mode from the sleep mode to the first mode if the controller does not detect the input information for a determination time in the sleep mode.

14. The operating device according to claim 2, wherein
the input information includes the user input received by the electric switch, and
the controller is configured to change the mode from the first mode to the second mode in response to the user input received by the electric switch.

15. The operating device according to claim 14, wherein
the controller is configured to change the mode from the second mode to the first mode if the controller does not detect the user input for a determination time in the second mode.

16. The operating device according to claim 1, wherein
the controller is configured to change the mode from the second mode to the first mode if the controller does not detect input information for a determination time in the second mode.

17. The operating device according to claim 1, wherein
the controller is configured to be stopped from consuming electricity in the first mode.

18. The operating device according to claim 1, wherein
the controller is configured to determine whether the additional device is in a predetermined mode based on the input information, and
the controller is configured to change the mode from the second mode to the first mode if the controller concludes that the additional device is in the predetermined mode.

19. The operating device according to claim 18, wherein
the controller is configured to generate a check signal in the second mode so as to determine whether the additional device is in the predetermined mode, and
the controller is configured to change the mode from the second mode to the first mode if the controller concludes that the additional device is in the predetermined mode.

* * * * *